United States Patent [19]

Ikkai et al.

[11] Patent Number: 5,923,728
[45] Date of Patent: Jul. 13, 1999

[54] MOTOR CONTROLLER

[75] Inventors: Yasufumi Ikkai, Kobe; Satoshi Tamaki, Hirakata; Masaki Tagome, Shijonawate; Mineaki Isoda, Kadoma; Tomokuni Iijima, Moriguchi; Kazushige Narazaki, Katano, all of Japan

[73] Assignee: Matsushita Electric Industrial Co., Ltd., Osaka, Japan

[21] Appl. No.: 09/073,955

[22] Filed: May 7, 1998

[30] Foreign Application Priority Data

May 9, 1997 [JP] Japan ................................ 9-119273

[51] Int. Cl.$^6$ ........................................................ H02P 5/28
[52] U.S. Cl. ........................ 378/807; 318/716; 318/798; 318/802; 318/254; 318/138; 318/434
[58] Field of Search ................................ 318/716, 798, 318/802, 254, 138, 439, 807

[56] References Cited

U.S. PATENT DOCUMENTS

| | | | |
|---|---|---|---|
| 4,638,224 | 1/1987 | Gritter | 318/254 |
| 4,698,562 | 10/1987 | Gale et al. | 318/254 |
| 5,504,404 | 4/1996 | Tamaki et al. | |
| 5,592,355 | 1/1997 | Ikkai et al. | |
| 5,652,495 | 7/1997 | Narazaki et al. | |
| 5,757,161 | 5/1998 | Ikkai et al. | |

FOREIGN PATENT DOCUMENTS 8266099  10/1996  Japan .

OTHER PUBLICATIONS

IEA–92–30, entitled "Development of High Performance Electric Vehicle Driving Device", along with an English Language Translation of section 3.1.

K. Hatanaka et al. "Variable Speed Drive System of Permanent Magnet Synchronous Motors with Flux–weakening Control," 1991 Society of Electrical Engineers Industrial Applications Division National Convention Monograph Collection No. 74, pp. 310–315, along with an English Language Translation of section 2–3.4.

*Primary Examiner*—Karen Masih
*Attorney, Agent, or Firm*—Greenblum & Bernstein, P.L.C.

[57] ABSTRACT

A motor controller comprises a stator current production unit for producing stator current commands that are command values for the stator current flowing through the stator windings, a drive unit for supplying electric power to the stator windings based on the stator current commands, a stator current detection unit ZU, ZV, and ZW, for detecting the stator currents flowing through the stator windings, and a saturation degree production unit for producing a saturation degree indicating by how much the stator current is not following the stator current command. The stator current production unit produces the stator current commands based on the saturation degree. The saturation degree production unit produces the saturation degree based on the current commands, the stator current signals, and the pole-position signals.

20 Claims, 18 Drawing Sheets

MOTOR CONTROLLER

BACKGROUND OF THE INVENTION

1. Field of the Invention

The present invention relates to a motor controller that, with high efficiency, performs weakening-field control on motors such as those used in electric automobiles.

2. Description of the Related Art

The brushless motor, which has no mechanical commutation mechanism, controls the sir current that flows through the stator windings, synchronously with the rotated position of the rotor, thus rotating the rotor in the predetermined direction, and generating the predetermined output torque. Because the magnetic field is formed by permanent magnets, this motor is very efficient, and is widely used in electric automobiles.

After describing brushless motor characteristics and weakening-field control, we will describe an example of the prior art.

Permanent magnets are set in place in the rotor of a brushless motor for forming magnetic fields. Let us posit a d axis that is in the same direction as the magnetic field, and a q axis rotated 90° away from the d axis by an electrical angle of 90°. Now, the q axis will be in the same direction as the back voltage excited in the stator winding by the magnetic field, and the current phase will advance when a current is added in the direction of the d axis. Hereinafter, as in FIG. 17, the size of the current is called I, the current component flowing in the d axis direction is called the d axis current Id, the current component flowing in the q axis direction is called the q axis current Iq, and the current phase is denoted as $\beta$.

When a current flows in the stator winding, the q axis component of the terminal voltage, Vq, and the d axis component thereof, Vd, can be expressed as in Eq 1. And the brushless motor output torque Trq may be expressed as in Eq 2. In these formulas, $\omega\theta$ is the electrical angular speed, R is the stator winding resistance, $\psi$ is the armature interline flux number, Ld is the d inductance, and Lq is the q axis inductance.

$$\begin{cases} Vd = R \cdot Id + \omega e \cdot Lq \cdot Iq \\ Vq = \psi \cdot \omega e + R \cdot Iq - \omega e \cdot Ld \cdot Id \end{cases} \quad (1)$$

$$Trq \begin{cases} = \psi \cdot Iq + (Lq - Ld) \cdot Iq \cdot Id \\ = \psi \cdot I \cdot \cos\beta + \frac{1}{2}(Lq - Ld) \cdot I^2 \cdot \sin 2\beta \end{cases} \quad (2)$$

In a surface-magnet type of brushless motor in which the permanent magnets are positioned on the surface, the d axis inductance and q axis inductance are equal (Ld=Lq), so the second term in Eq 2 will be 0, and, when the current value I is constant, the output torque Trq will have a maximum value at current phase $\beta=0°$. In an embedded-magnet type of motor, on the other hand, wherein the permanent magnets are embedded in the rotor, the d axis inductance Ld is smaller than the q axis inductance Lq, so a maximum value will be obtained in the first term in Eq 2 when the current phase $\beta=0°$, and in the second term in Eq 2 when $\beta=45°$. Accordingly, as plotted in FIG. 18, a maximum value T0 for the output torque is expressed at some value ($\beta 0°$) between $\beta=0°$ and $\beta=45°$.

When a brushless motor is running, if the rotational speed a of the brushless motor is increased, the induced voltage arm becomes larger, as represented in the weakening-field control vector diagram in FIG. 19A. When the voltage V to which $\omega_s\psi$, RIq, and $\omega$LqIq have been vector-added reaches the voltage limit circle, it will no longer be possible to increase the rotational speed above the brushless motor rotational sped a attained when the voltage V reached the voltage limit circle.

Now, when the power supply is something like a battery, due to the load current, the battery's terminal voltage and current values will vary. For the sake of simplicity, however, the battery terminal voltage (i.e. the radius of the voltage limit circle) is here assumed to be constant.

Let us next consider what happens when the brushless motor rotational speed is increased. As diagrammed in FIG. 19, by having a current Id flow, a voltage $\omega$LdId will be generated in a direction returning back inside the voltage limit circle. In this way, excess voltage is generated that increases the rotational speed of the brushless motor as diagrammed In FIG. 19B. When the rotational speed of the brushless motor is constant, it is possible to produce a q axis current Iq by the amount of the excess voltage generated, making it possible to generate more output torque in the brushless motor. And when the current value is constant, as diagrammed in FIG. 19C, it is possible to increase the rotational speed $\omega$ by the amount of the excess voltage generated. Controlling a motor by making a d axis current Id flow in the stator winding and generating a voltage excess is called weakening-field control.

Now, if the current value is held constant and the current phase is varied, the d axis current Id will increase, so a voltage excess will be generated and weakening-field control will be effective. At the same time, the q axis current Iq will be diminished, causing LqIq to decease and the voltage value V to become smaller, thus generating further voltage excess.

Furthermore, the d axis current Id that generates the excess in the voltage need only be the minimum necessary to make the terminal voltage supplied to the brushless motor return back inside the voltage limit circle. If the d axis current Id provided is greater than this necessary minimum, copper losses will increase, and the brushless motor's efficiency will deteriorate.

When there is excess voltage available, moreover, the stator current will follow the stator current command well, as diagrammed in FIG. 5A, but when the voltage excess disappears, the stator current will not follow the stator current command, as diagrammed in FIG. 5B.

One method for implementing weakening-field control for brushless motors known in the prior art is that set forth in IEA-92-30, a document of the Electrical Engineering Research Society prepared by its Industrial Electric Power Applications Research Group.

In performing weakening-field control, the d axis current command Id* is calculated as in Eq 3.

$$Id^* = Id^* max \cdot \frac{\omega - \omega base}{\omega max - \omega base} \quad (3)$$

Here, $\omega_{base}$, is the base rotational speed, $\omega_{max}$ is the maximum rotational speed, and Id*$_{max}$ is the d axis current at the maximum rotational speed $\omega_{mar}$.

In the 1991 Society of Electrical Engineers Industrial Applications Division National Convention Monograph Collection No. 74, on pp.310–315, the d axis current command Id* for performing weakening-field control is calculated using the target rotational speed, d axis winding reactance, q axis winding reactance, aor winding resistance, and no-load induced voltage at the unit speed.

SUMMARY OF THE INVENTION

In an actual brushless motor, however, due to variation in the resistance value according to operating conditions, to inductance variation caused by flux saturation, and to variation in motor constants brought about by degradation over time, the d axis current command Id* as calculated from the computation formulas in the prior art is not ideal.

An object of the present invention is to implement a motor controller for performing weakening-field control at high efficiency, realizing an ideal d axis current Id* even when motor constants vary due to operating conditions or degradation over time.

According to the present invention a motor controller comprises: a rotor having P poles (where P is an even number 2 or greater); a K-phase stator winding (where K is an integer 2 or greater) for generating magnetic flux that interlinks with the rotor; current command production unit for producing current commands that are current values for stator currents flowing through the stator winding; drive unit for supplying electric power to the stator winding based on the current commands; stator current detection unit for detecting stator currents flowing through the stator winding; saturation degree production unit for producing a saturation degree indicating by what amount the stator current is not following the current command; and pole-position signal production unit for producing pole-position signals based on the pole positions of the rotor; wherein: the current command production unit produce the current commands based on the saturation degree; and the saturation degree production unit produce a saturation degree based on the current commands, the stator current, and the pole-position signals. The motor controller of the present invention achieves highly efficient weakening-field control on a motor because it varies the current phase on the basis of precise saturation degrees.

The motor controller of a first aspect of the present invention is a motor controller that comprises: a rotor having P poles (where P is an even number 2 or greater); a K-phase stator winding (where K is an integer 2 or greater) for generating magnetic flux that interlinks with the rotor, current command production unit for producing current commands that are current values for stator currents flowing through the stator winding; drive unit for supplying electric power to the stator winding based on the current commands; stator current detection unit for detecting stator currents flowing through the stator winding; saturation degree production unit for producing a saturation degree indicating by what amount the stator current is not following the current command; and pole-position signal production unit for producing pole-position signals based on the pole positions of the rotor; wherein: the stator winding comprises three phases (U phase, V phase, and W phase); the current command production unit produce the current commands based on the saturation degree; the saturation degree production unit comprise: amplitude value production unit for producing a current error amplitude value indicating the size of the difference between the current command and stator current; and integration unit for taking the result of integrating the current error amplitude value for a period that is exactly n multiples of the half period of the pole-position signal (where n is an integer) and making that the saturation degree; and the integration unit integrate the current error amplitude value for the U phase from either the rise or fall of the pole-position signal for the V phase and make the result thereof the saturation degree.

The motor controller of a second aspect of the present invention is a motor controller that comprises: a rotor having P poles (where P is an even number 2 or greater); a K-phase stator winding (where K is an integer 2 or greater) for generating magnetic flux that interlinks with the rotor, current command production unit for producing current commands that are current values for stator currents flowing through the stator winding; drive unit for supplying electric power to the stator winding based on the current commands; stator current detection unit for detecting stator currents flowing through the stator winding; saturation degree production unit for producing a saturation degree indicating by what amount the stator current is not following the current command; and pole-position signal production unit for producing pole-position signals based on the pole positions of the rotor; wherein: the current command production unit produce the current commands based on the saturation degree; the saturation degree production unit comprise: amplitude value production unit for producing a current error amplitude value indicating the size of the difference between the current command and stator current and integration unit for taking the result of integrating the current error amplitude value for a period that is exactly n multiples of the half period of the pole-position signal (where n is an integer) and making that the saturation degree; and the integration unit cause the value of n to vary based on at least one or other of the motor rotational speed and the current command.

The motor controller of a third aspect embodiment of the present invention is a motor controller that comprises: a rotor having P poles (where P is an even number 2 or greater); a K-phase stator winding (where K is an integer 2 or greater) for generating magnetic flux that interlinks with the rotor; current command production unit for producing current commands that are current values for stator currents flowing through the stator winding; drive unit for supplying electric power to the stator winding based on the current commands; stator current detection unit for detecting stator currents flowing through the stator winding; saturation degree production unit for producing a saturation degree indicating by what amount the stator current is not following the current command; and pole-position signal production unit for producing pole-position signals based on the pole positions of the rotor; wherein: the current command production unit produce the current commands based on the saturation degree; the saturation degree production unit comprise: amplitude value production unit for producing a current error amplitude value indicating the size of the difference between the current command and stator current and integration unit for taking the result of integrating the current error amplitude value for a period that is exactly n multiples of the half period of the pole-position signal (where n is an integer) and making that the saturation degree; and the integration unit make either the rise or fall of the K-phase pole-position signal an integration-start time indicating the timing whereby integration is started, and vary the integration-start time based on at least one or other of the rotational speed and stator current command.

The motor controller of a fourth aspect of the present invention is a motor controller that comprises: a rotor having P poles (where P is an even number 2 or greater); a K-phase stator winding (where K is an integer 2 or greater) for generating magnetic flux that interlinks with the rotor; current command production unit for producing current commands that are current values for stator currents flowing through the stator winding; drive unit for supplying electric power to the stator winding based on the current commands; stator current detection unit for detecting stator currents flowing through the stator winding; saturation degree production unit for producing a saturation degree indicating by what amount the stator current is not following the current command; and pole-position signal production unit for producing pole-position signals based on the pole positions of the rotor; wherein: the current command production unit produce the current commands based on the saturation degree; the saturation degree production unit comprise: amplitude value production unit for producing a current error amplitude value indicating the size of the difference between the current command and stator current; and integration unit for taking the result of integrating the current error amplitude value for a period that is exactly n multiples of the half period of the pole-position signal (where n is an integer) and making that the saturation degree; amplification factor production unit are added for producing an amplitude factor based on at least one or other of the motor rotational speed and the current command; and the amplitude value production unit produce a current error amplitude value based on the amplification factor.

The motor controller of a fifth aspect of the present invention is a motor controller that comprises: a rotor having P poles (where P is an even number 2 or greater); a K-phase stator winding (where K is an integer 2 or greater) for generating magnetic flux that interlinks with the rotor; current command production unit for producing current commands that are current values for stator currents flowing through the stator winding; drive unit for supplying electric power to the stator winding based on the current commands; stator current detection unit for detecting stator currents flowing through the stator winding; saturation degree production unit for producing a saturation degree indicating by what amount the stator current is not following the current command; and pole-position signal production unit for producing pole-position signals based on the pole positions of the rotor; wherein: the current command production unit produce the current commands based on the saturation degree; the saturation degree production unit comprise: amplitude value production unit for producing a current error amplitude value indicating the size of the difference between the current command and stator current and integration unit for taking the result of integrating the current error amplitude value for a period that is exactly n multiples of the half period of the pole-position signal (where n is an integer) and making that the saturation degree; reference position signal production unit are added for producing a reference position signal that indicates a reference position for the rotor rotated position; and the saturation degree production unit produce a selection signal from the results of selecting either the pole-position signal or the reference position signal, based on at least one or the other of the motor rotational speed and the stator current command, and produce the saturation degree based on the selection signal.

The motor controller of a fifth aspect of the present invention is a motor controller that comprises: a rotor having P poles (where P is an even number 2 or greater); a K-phase stator winding (where K is an integer 2 or greater) for generating magnetic flux that interlinks with the rotor; current command production unit for producing current commands that are current values for stator currents flowing through the stator winding; drive unit for supplying electric power to the stator winding based on the current commands; stator current detection unit for detecting stator currents flowing through the stator winding; saturation degree production unit for producing a saturation degree indicating by what amount the stator current is not following the current command; and pole-position signal production unit for producing pole-position signals based on the pole positions of the rotor; wherein: coordinate conversion unit are added for producing stator current commands based on the current commands by coordinate conversion; the current command production unit produce the current commands based on the saturation degree; the saturation degree production unit comprise: amplitude value production unit for producing a current error amplitude value indicating the size of the difference between the current command and stator current; and integration unit for taking the result of integrating the current error amplitude value for a period that is exactly n multiples of the half period of the pole-position signal (where n is an integer) and making that the saturation degree, and for taking the integration-start time indicating the timing whereby integration is started and making that one of the times that the error between the K-phase stator current command and the stator current becomes 0.

DESCRIPTION OF THE PREFERRED EMBODIMENTS

The first embodiment will now be described.

Figure 1:
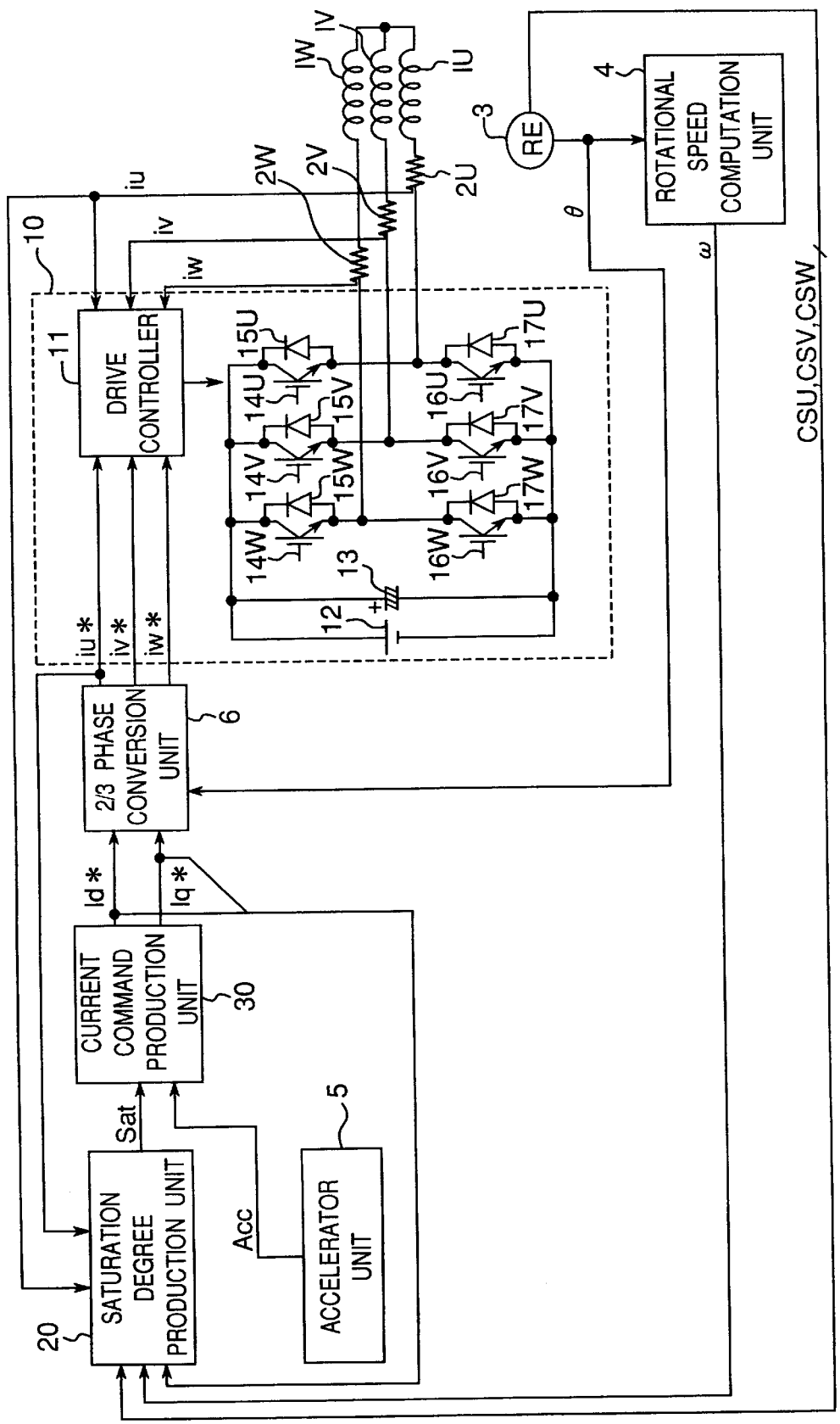
FIG. 1 is a block diagram of the operation of a motor controller in a first embodiment of the present invention.

FIG. 1 is a block diagram representing the operation of the motor controller in the first embodiment. Stator windings 1U, 1V, and 1W of the brushless motor are connected to drive unit 10. The motor has a rotor Rt with 2n poles (n being an integer). Current detection unit 2U, 2V, and 2W detect stator currents iu, iv, and iw flowing in the stator windings 1U, 1V, and 1W, and output both to a drive controller 11 in drive unit 10 and to a saturation degree production unit 20. A rotary encoder 3 detects the pole position and rotated position θ of a rotor Rt of the brushless motor, outputs pole-position signals CSU, CSV, and CSW indicating these pole positions to the saturation degree production unit 20, and outputs the rotated position θ to rotational speed computation unit 4 and to ⅔ phase conversion unit 6. The rotational speed computation unit 4 compute the rotational speed ω based on the rotated position θ, and output this to the saturation degree production unit 20. An accelerator unit 5 outputs an acceleration value Acc to current command production unit 30.

The saturation degree production unit 20 produce a saturation degree Sat based on the pole-position signals CSU, CSV, and CSW, the stator current command iu*, the stator current iu, the d axis current command Id*, and the q axis current command Iq*. The current command production unit 30 produce the d axis current command Id* and the q axis current command Iq* based on the acceleration value Acc and the saturation degree Sat, and output these to the ⅔ phase conversion unit 6 and the saturation degree production unit 20. The ⅔ phase conversion unit 6 produce the stator current commands iu* iv*, and iw*, based on the rotated position e, the d axis current command Id*, and the q axis current command Iq*, and output these to the drive controller 11 in the drive unit 10.

The drive unit 10 supply power to the stator windings 1U, 1V, and 1W, based on the stator current commands iu*, iv*, and iw*, and on the stator currents iu, iv, and iw. The drive controller 11 in the drive unit 10 control gate voltages on upper IGBTs 14U, 14V, and 14W, and on lower IGBTs 16U, 16V, and 16W. The positive terminal of a power supply 12 is connected to the collectors of the upper IGBTs 14U, 14V, and 14W, while the negative terminal thereof is connected to the emitters of the lower IGBTs 16U, 16V, and 16W. An electrolytic capacitor 13 is connected in parallel with the power supply 12. The emitters of the upper IGBTs 14U, 14V, and 14W, respectively, and the collectors of the lower IGBTs 16U, 16V, and 16W, respectively, are connected to each other, and also to the stator windings 1U, 1V, and 1W, respectively. Upper diodes 15U, 15V, and 15W, and lower diodes 17U, 17V, and 17W, are connected to the upper IGBTs 14U, 14V, and 14W, and to the lower IGBTs 16U, 16V, and 16W, respectively, cathode to collector and anode to emitter.

The operation is now described.

The rotational speed computation unit 4 sample the rotated angle θ (degrees) with a sampling interval ΔT (seconds), and obtain the rotational speed ω (rpm) by the formula noted below in Eq 4.

$$\omega \text{ [r/min]} = \frac{1}{6} \frac{\theta(i) \text{ [degree]} - \theta(i-1) \text{ [degree]}}{\Delta T \text{ [sec]}} \quad (4)$$

Figure 2:
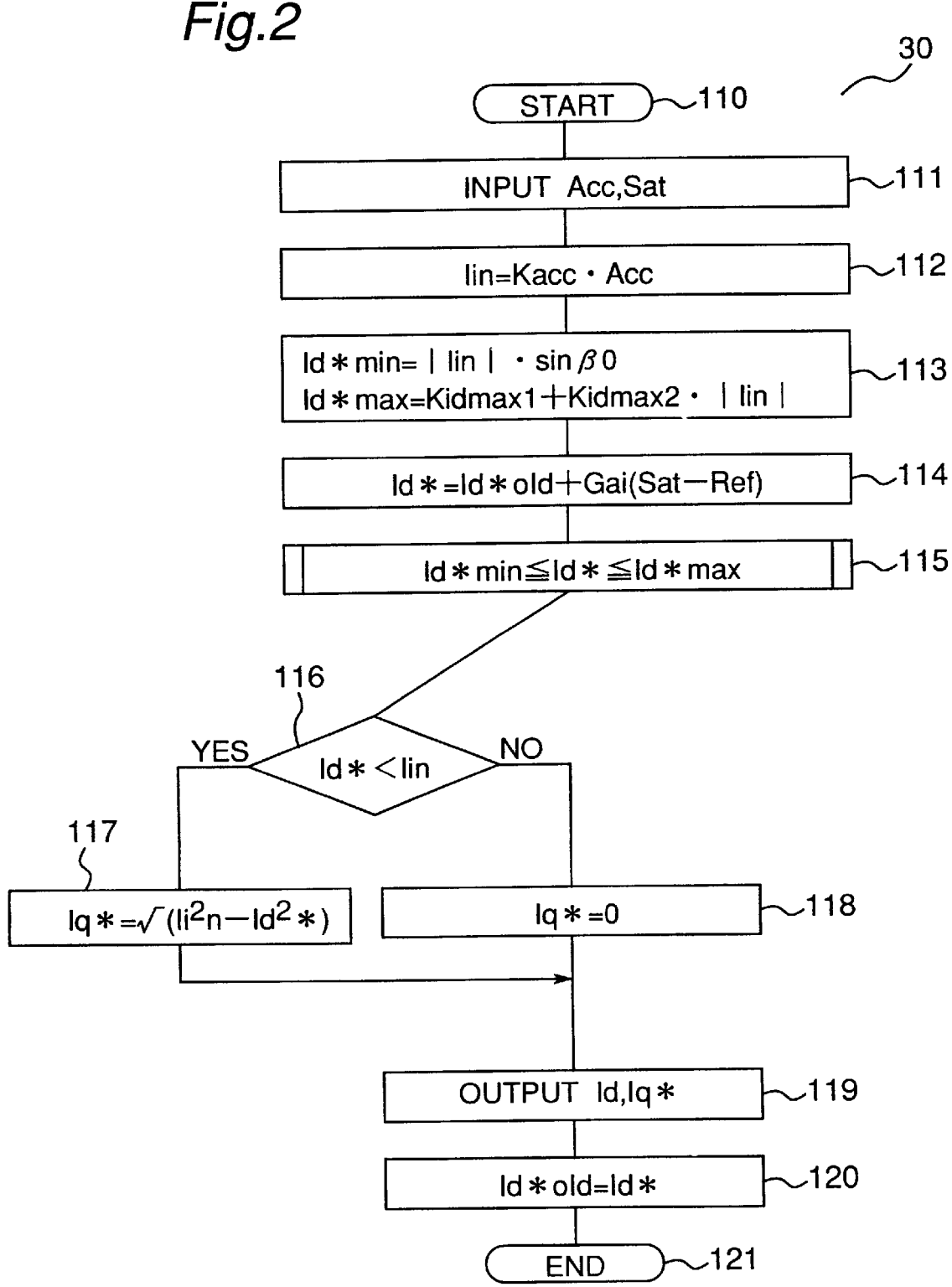
FIG. 2 is a flowchart of the operation of the current command production unit in the same.

The accelerator unit 6 produces an accelerator value Acc proportional to the accelerator depression angle. The saturation degree production unit 20 produce a saturation degree by a method described subsequently. The operations of the current command production unit 30 are next described. FIG. 2 is a flowchart for the operations of the current command production unit in the first embodiment, which will now be described in detail. Subroutine 110 starts the current command operations. Subroutine 111 inputs an ace or value Acc and the saturation degree Sat. Subroutine 112 produces a current index Iin. The current index Iin is the product of the multiplication of the accelerator value Acc and a set constant Kacc, as expressed in Eq 5 below. Here, the constant Kacc is set so that, when the absolute value of the accelerator value Acc reaches maximum, the absolute value of the current index Iin becomes the maximum absolute value of the current command in the current index circumferential operating mode (described subsequently). Moreover, the maximum absolute value of the current command in the current index circumferential operating mode is set according to the maximum allowable IGBT current and maximum torque output value.

$$Iin = Kacc \cdot Acc \quad (5)$$

Figure 18:
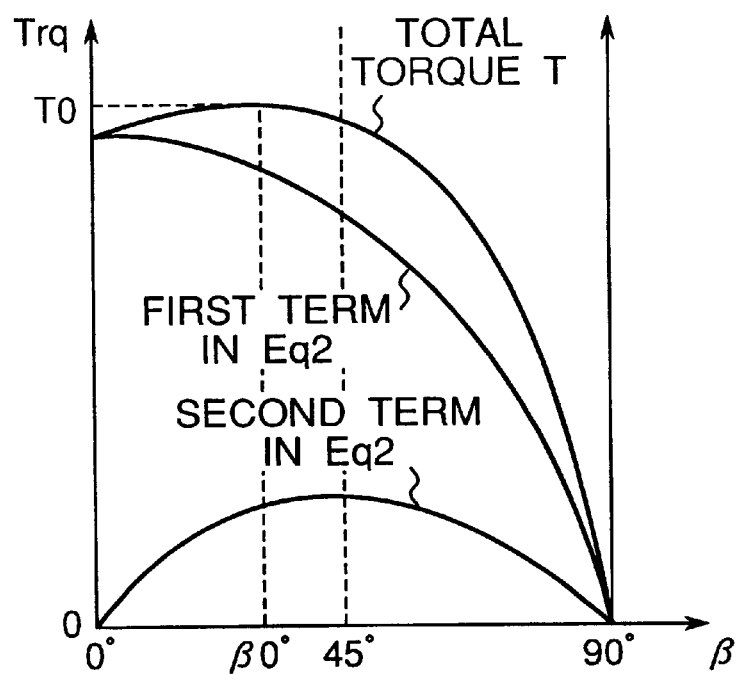
FIG. 18 is a relational diagram for the current phase and output torque in an embedded-magnet type of brushless motor.
Figure 19A:
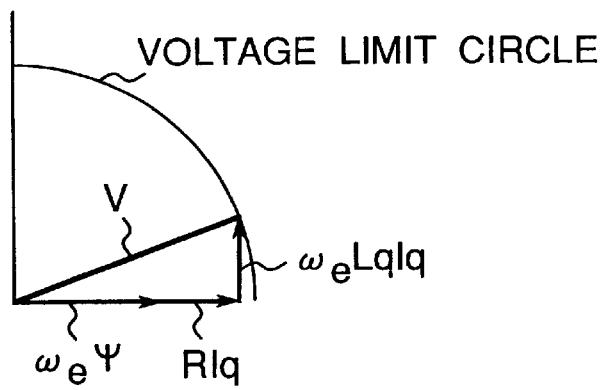
FIGS. 19A, 19B, and 19C are weakening-field control vector diagrams.
Figure 19B:
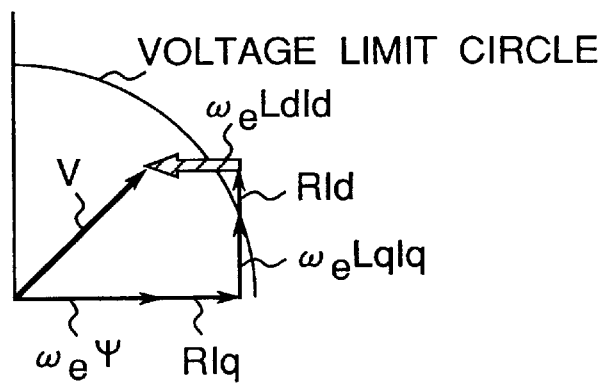
Figure 19C:
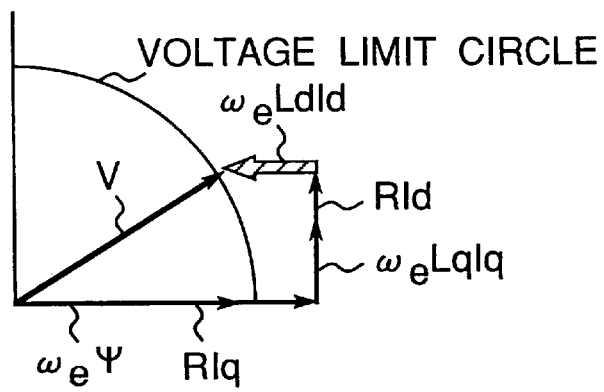

Subroutine 113 produces minimum and maximum values for the d axis current command Id*, namely Id*min and Id*max. The minimum value Id*min is made the product of multiplying the absolute current index absolute value |Iin| by sinβ0, as expressed in Eq 6 below. β0 is the current phase β that provides the maximum value of the output torque Trq of the brushless motor, as diagrammed in FIG. 18, being 0° in a surface-magnet type brushless motor, and a value between 0° and 45° in an embedded-magnet type brushless motor. Meanwhile, the maximum value Id*max is made the sum obtained by adding a set constant Kidmax1 to the product of multiplying some set constant Kidmax2 by the current index absolute value |Iin|.

$$\begin{cases} Id^*min = |Iin| \cdot \sin\theta 0 \\ Id^*max = Kidmax1 + Kidmax2 \cdot |Iin| \end{cases} \quad (6)$$

Subroutine 114 produces the d axis current command Id*. As expressed in Eq 7 below, the difference obtained by subtracting the reference value Ref from the station degree Sat is multiplied by a gain Gai, and to that product is added the previous value of the d axis current command Id*old to yield the d axis current command Id*. The previous value Id*old stores the previous value of the d axis current command.

$$Id^* = Id^*old + Gai \cdot (Sat - Ref) \quad (7)$$

Subroutine 115 limits the d axis current command Id*. When the d axis current command Id* is smaller than the minimum value Id*min (Id*<Id*min), the d axis current command Id* is changed to the minimum value Id*min (Id*=Id*min). And when the d axis current command Id* is larger than the maximum value Id*max (Id*>Id*max), the d axis current command Id* is changed to the maximum value Id*max (Id*=Id*max).

Subroutine 116 branches between the current index circumferential operating mode and the d axis operating mode, according to the size of the d axis current command Id*. When the d axis current command Id* is smaller than the current index (Id*<Iin), subroutine 117 is executed next as the current index circumferential operating mode. And when the d axis current command Id* equals or is greater than the current index (Id*≧Iin), subroutine 118 is executed next as the d axis operating mode.

Subroutine 117 produces the q axis current command Iq* (current index circumferential operating mode). The square root is taken of the difference obtained by subtracting the square of the d axis current command Id* from the square of the current index Iin, and that is made the q axis current command Iq*.

Subroutine 118 produces the q axis current index Iq* (d axis operating mode). The q axis current command Iq* is made 0. Subroutine 119 outputs both the d axis current command Id* and the q axis current command Iq*. Subroutine 120 stores the d axis current command Id*. Because the d axis current command Id* is used in the next subroutine, the d axis current command Id* is made a new previous value Id*old for the d axis current command. Here Id*old is initialized with a value of 0. Subroutine 121 terminates current command production. Then the ⅔ phase conversion unit 7 take the d axis current command Id* and the q axis current command Iq* that are on 2-phase rotating coordinates and convert them to the stator current commands iu*, iv*, and iw* on 3-phase stationary coordinates, as expressed below in Eq 8, where θe is the electrical rotated angle, which is suitably converted from the rotated angle θ. The period of this electrical rotated angle θe is a 1/p multiple of the period of the rotated angle θ (when the rotor in the brushless motor has 2p magnetic poles).

$$\begin{pmatrix} iu^* \\ iv^* \\ iw^* \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} \cos\theta e & \sin\theta e \\ -\sin\theta e & \cos\theta e \end{pmatrix} \begin{pmatrix} Id^* \\ Iq^* \end{pmatrix} \quad (8)$$

The drive unit 10 send currents expressed by the stator current commands iu*, iv*, and iw*, through the stator windings 1U, 1V, and 1W. This is described in greater detail below.

Figure 3:
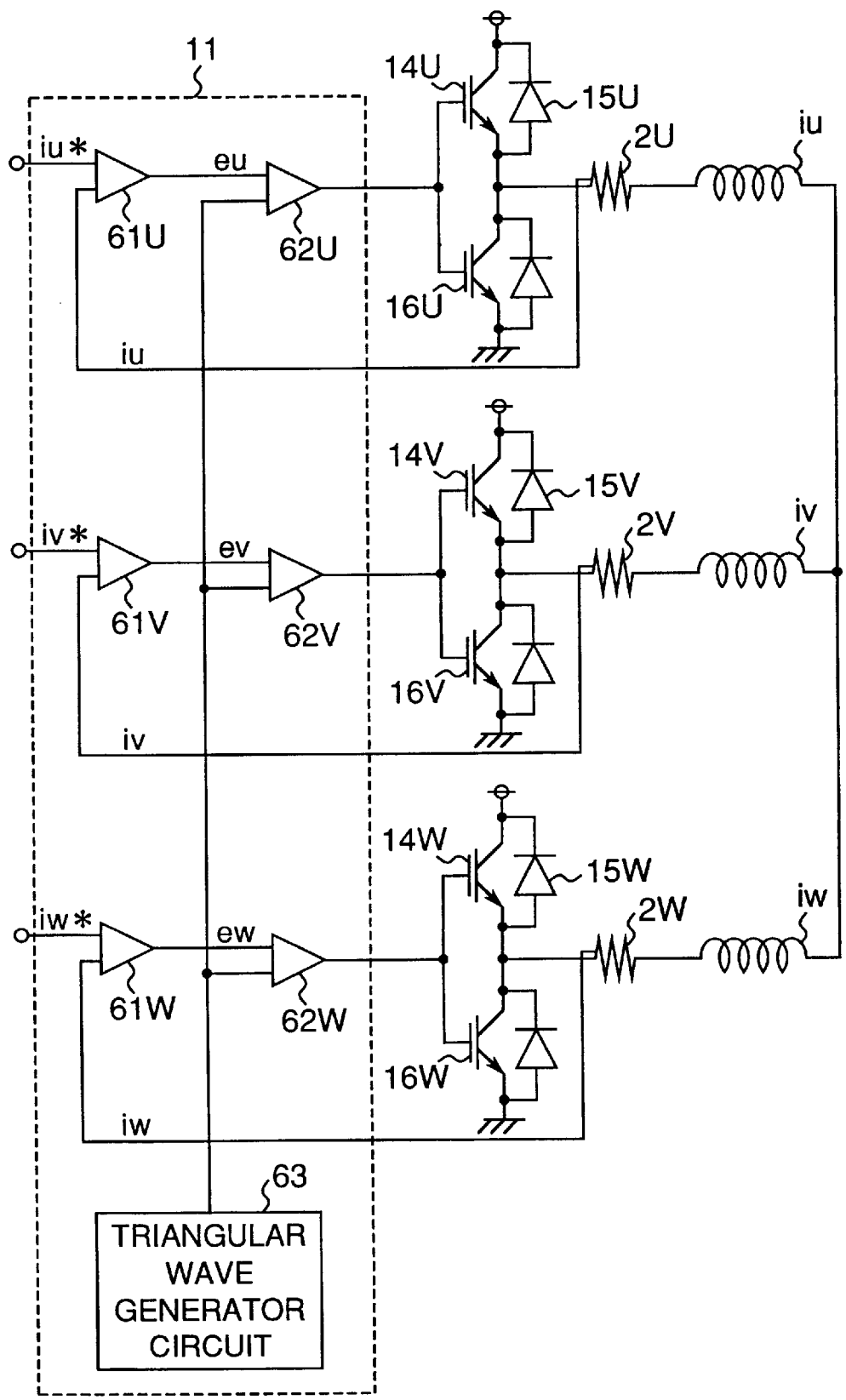
FIG. 3 is a schematic diagram of a drive controller in the same.

The power supply voltage 12 provides power to the drive unit 10, while the electrolytic capacitor 13 smoothes out the power supply voltage 12. FIG. 3 is a schematic diagram of a drive controller in the first embodiment. The drive controller 11 comprises differential amplifiers 61U, 61V, and 61W, comparators 62U, 62V, and 62W, and a triangular wave generator 63. The differential amplifiers 61U, 61V, and 61W, as expressed below in Eq 9, multiply the differences obtained by subtracting the stator currents iu, iv, and iw from the stator current commands iu*, iv*, and iw*, respectively, by a current minor gain Ke that is some set constant and sets the products so obtained as the PWM current errors eu, ev, and ew, respectively. Here, in Eq 9, only a proportion operation is performed, but it is permissible to make this either a proportion-integration operation or a proportion-integration-differentiation operation. The triangular wave generator circuit generates a triangular wave (having a frequency of from several kHz to several+kHz). The comparator 62U compares the PWM current error eu against the triangular wave. If the PWM current error eu is larger, then the upper IGBT 14U is made conductive and the lower IGBT 16U is made non-conductive. If the PWM currant error eu is smaller, the upper IGBT 14U is made non-conductive, and the lower IGBT 16U is made conductive. The comparator 62V compares the PWM current error eu against the triangular wave. If the PWM current error ev is larger, then the upper IGBT 14V is made conductive and the lower IGBT 16V is made non-conductive. If the PWM current error ev Is smaller, the upper IGBT 14V is made non-conductive, and the lower IGBT 16V is made conductive. The comparator 62W compares the PWM current error ew against the triangular wave If the PWM current error ew is larger, then the upper IGBT 14W is made conductive and the lower IGBT 16W is made nonconductive. If the PWM current error ew is smaller, the upper IGBT 14W is made non-conductive, and the lower IGBT 16W is made conductive. When the conducting state of the upper IGBTs and lower IGBTs is in transition, both the upper and lower IGBTs are made non-conductive, for which purpose a short time (dead time) is provided to protect the drive power supply 12 from a short.

$$\begin{cases} eu = Ke \cdot (iu^* - iu) \\ ev = Ke \cdot (iv^* - iv) \\ ew = Ke \cdot (iw^* - iw) \end{cases} \quad (9)$$

Weakening-field control using the saturation degree will now be described.

Figure 4:
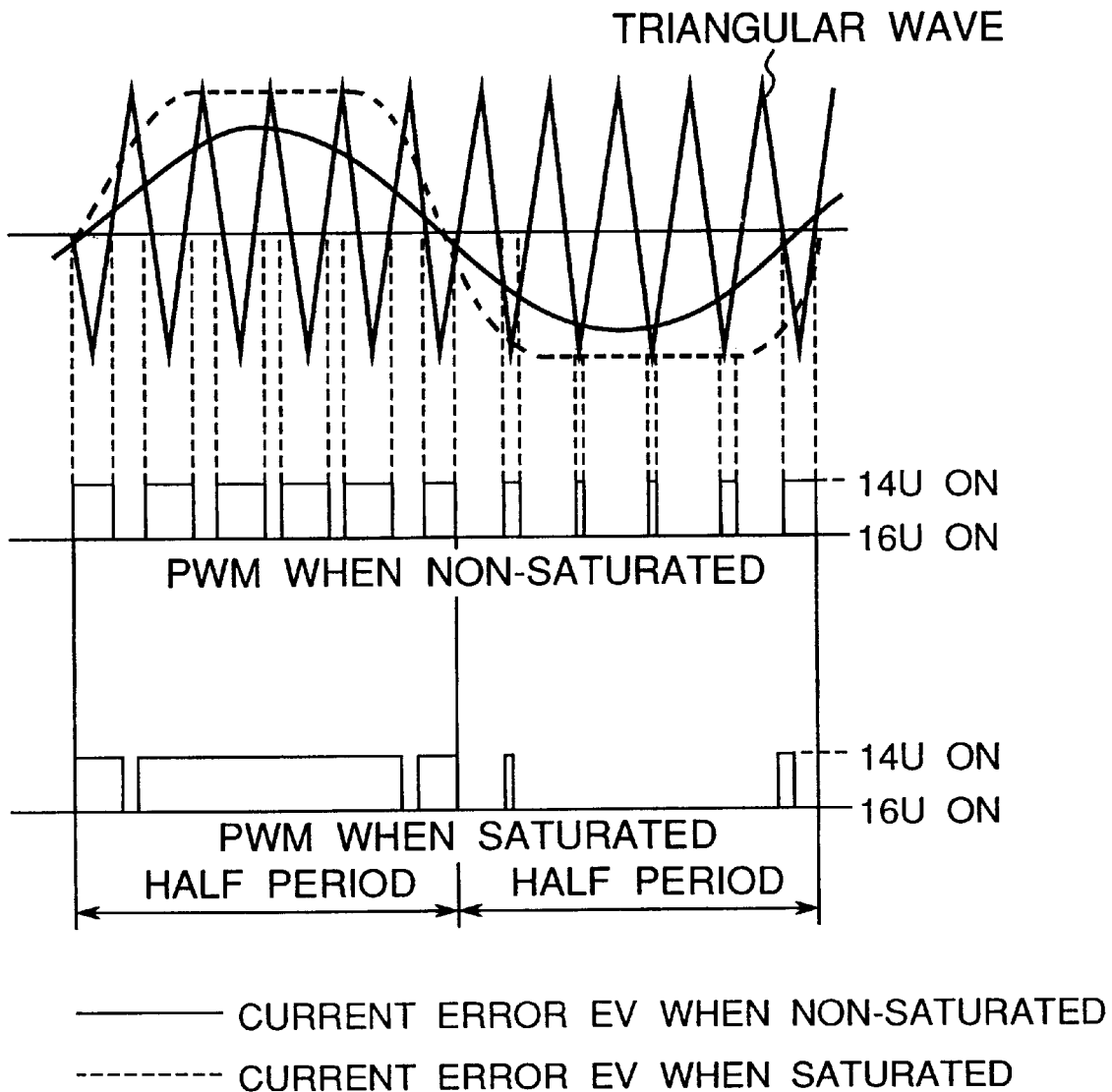
FIG. 4 is a waveform diagram representing PWM signals when saturated and when non-saturated.
Figure 5A:
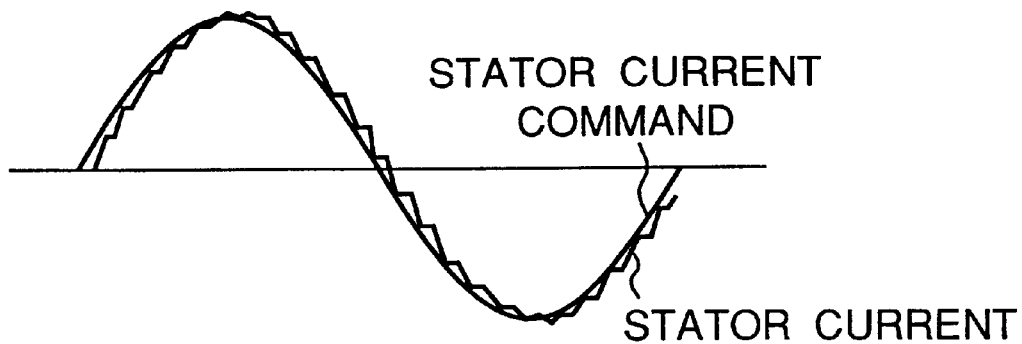
FIG. 5A is a waveform diagram representing stator current and stator current commands when saturated.
Figure 5B:
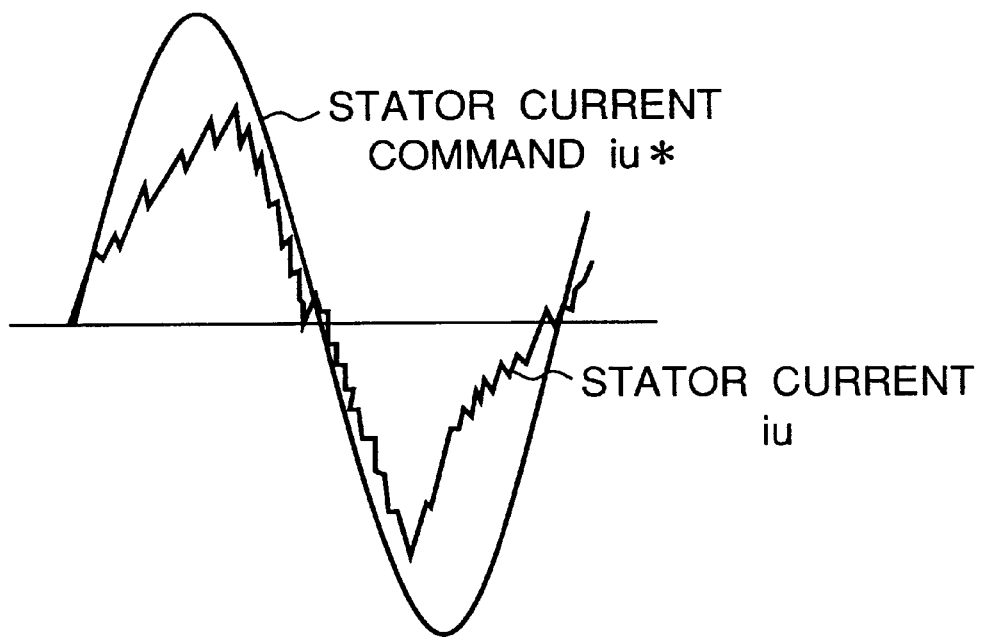
FIG. 5B is a waveform diagram representing stator current and stator current commands when non-saturated.

FIG. 4 is a waveform diagram of the PWM signal during saturation and non-saturation. In this diagram are represented the triangular wave, the PWM current error eu, the operations of the upper IGBT 14U, and the operations of the lower IGBT 16U. FIGS. 5A and 5B are waveform diagrams of the stator current command and stator current during saturation and non-saturation, showing the stator current command Iu* and the stator current iu.

During non-saturation, the amplitude of the PWM current error eu is smaller than the triangular-wave amplitude, and the stator current iu follows the stator current command iu* as in FIG. 5A. During saturation, however, the amplitude of the PWM current error eu is larger than the triangular wave amplitude, a condition is reached in which there is no extra voltage, such that, in part, either the upper IGBT 14U or the lower IGBT 16U is always conducting, and the stator current iu does not follow the stator current command iu*, as in FIG. 5B.

In other words, during non-saturation, there is extra voltage available, and the current error is small, whereas during saturation, there is no extra voltage available and the current error is large. As was noted in the description of "weakening-field control") in the prior art, moreover, when the d axis current Id is increased, the voltage excess is increased, and when the d axis current Id is decreased, the voltage excess decreases.

Thereupon, using a value for the saturation degree Sat that indicates the size of the current error, the d axis current Id is increased or decreased by any increase or decrease in the saturation degree Sat, thereby controlling the voltage excess. Now, due to the peculiar characteristics of PWM control, a current error exists, as in FIG. 5A even when there is a voltage excess. Thereupon, feedback control is implemented in which, taking the saturation degree Sat at this time as the reference value Ref, when the saturation degree Sat is larger than the reference value Ref (Sat>Ref), it is judged that there is no voltage excess and the d axis current in increased, and when the saturation degree Sat is smaller than the reference value Ref (Sat>Ref), it is judged that sufficient voltage excess is available and the d axis current is reduced, thereby making the saturation degree Sat and the reference value Ref equal. In this way, copper loss is minimized by making the d axis current Id the necessary minimum. Subroutine 114 in the current command production unit 50 (FIG. 2) performs the operation just described, implementing ideal Id, and conducting highly efficient weakening-field control.

The operation and benefits of current command vectors are now discussed.

Figure 6A:
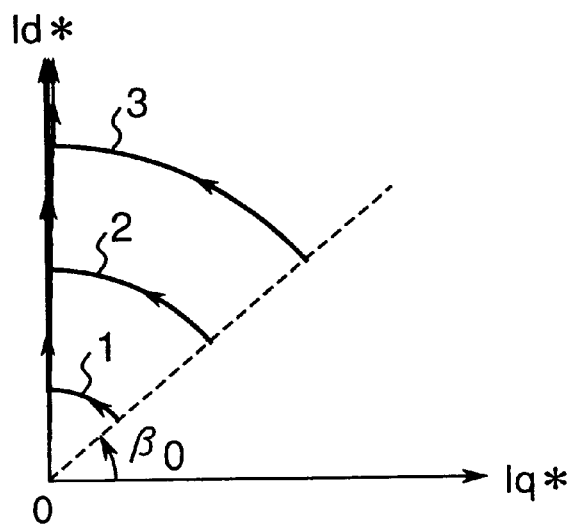
FIG. 6A is an explanatory diagram representing current vector loci in the first embodiment.
Figure 6B:
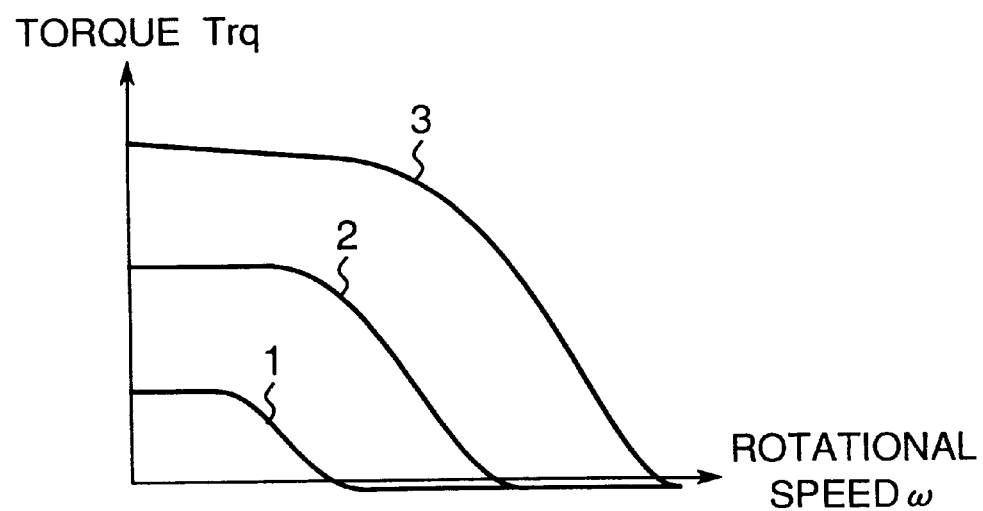
FIG. 6B is a diagram representing torque characteristics in the same.

When the motor is running, subroutine 116 in the current command production unit 50 (FIG. 2) branches to the current index circumferential operating mode (subroutine 117) and the d axis operating mode (subroutine 118). FIG. 6A is an explanatory diagram in which are plotted the loci of current vectors in the first embodiment the circumference therein representing the size of the current index When the brushless motor rotational speed ω increases, the voltage excess eventually disappears, the saturation degree Sat becomes larger, and the d axis current command Id* increases due to subroutine 114, whereupon the current commands (Iq* and Id*) change directions as indicated by the arrows. First of all, the current commands (Iq*, Id*) move on the current index circumference (in the current command circumferential operating mode) until the current phase index changes from β0 to 90°, after which they move on the d axis (d axis operating mode) while increasing the d axis current command Id*. Here, since β0 is the current phase (cf. FIG. 18) that realizes the maximum output torque Trq in the brushless motor, when in the current command circumferential operating mode, the current phase β will advance as the rotational speed ω increases, and the output torque Trq will decrease (indicated by the portions dropping off to the right in FIG. 6B). In the d axis operating mode, Iq*=0, so, from Eq 2, the output torque becomes Trq=0 (the Trq=0 portions in FIG. 6B).

Furthermore, when the current index proportional to the accelerator value increases in the order of (1)→(2)→(3), the output torque Trq also increases in the order of (1)→(2)→(3).

Now, in cases where the application is a controller for an electric automobile motor, when the angle of accelerator depression is constant, and both the rotational speed and the output torque increase, the electric automobile will accelerate faster than the driver intends, and the driver will feel uncomfortable. Moreover, since the driver drives the electric automobile with the presupposition that the output torque will increase when he or she steps on the accelerator, if the output torque decreases when the accelerator is depressed so as to increase the accelerator value, the driver will feel uncomfortable, and the driving feel of the electric automobile may become poor.

Thus, since the output torque Trq decreases when the rotational speed ω increases, and the direction of increase in the accelerator value and the direction of increase in the output torque Trq are the same throughout the entire rotating region, it is possible to effect safe and more natural driving.

The configuration and operation of the saturation degree production unit 20 are now described.

Figure 7:
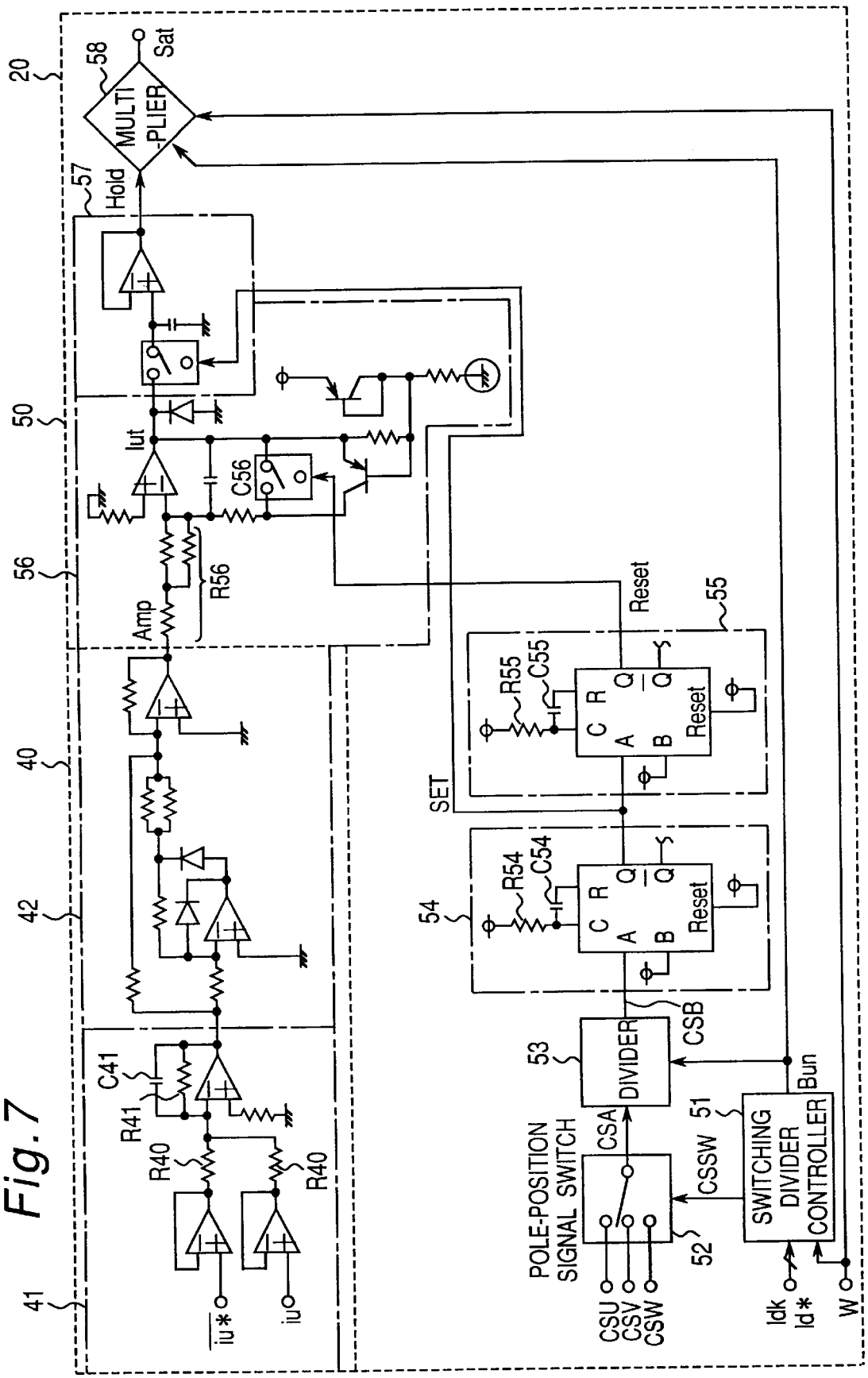
FIG. 7 is a schematic diagram of the saturation degree production unit in the same.

FIG. 7 is a schematic diagram of the saturation degree production unit in the first embodiment. As represented in FIG. 7, the saturation degree production unit 20 comprise: amplitude value production unit 40 for producing a current error amplitude value Amp based on the stator current command iu* and the stator current iu; and integration unit 50 for producing a saturation degree Sat based on the current error amplitude value Amp, the pole position signals CSU, CSV, and CSW, the rotational speed ω, and the current commands (Id* and Iq*).

The amplitude value production unit 40 are first described. The amplitude value production unit 40 comprise an adder circuit 41 and an absolute value circuit 42. In the adder circuit 41, as diagrammed in FIG. 7, the opposite-signed value of the stator current command iu* is input to a resistor via a buffer configured by an operational amplifier, and the stator current iu is input to a resistor via a buffer configured by an operational amplifier. The characteristics of the adder circuit 41 are determined by the resistance of the resistor R40, the resistance of the resistor R41, and the capacitance of a capacitor C41, as expressed in Eq 10. Here, the resistance value of the two resistors designated R40 is the same, Vi is the input value, and Vo is the output value, forming a lowpass filter for removing the noise generated in the stator current iu by the IGBT switching. The value of the cutoff frequency fc=1/(2π·C41·R41) is here set higher than the frequency of the stator current command iu*. Two values are inverse-addition-amplified, producing the current error Iu*−Iu, as noted in FIG. 8. By making the cutoff frequency for the adder circuit 41 greater than the frequency of the stator current command iu*, the gain of the current error iu*−iu is caused not to be changed by the rotational speed ω. The value actually output here is the value produced after passing through the lowpass filter having a DC gain of R41/R40 and cutoff frequency fc, so the result is multiplied by the value in the current error iu*−iu. As an expedient, therefore, it is expressed by the current error iu*−iu.

Figure 8:
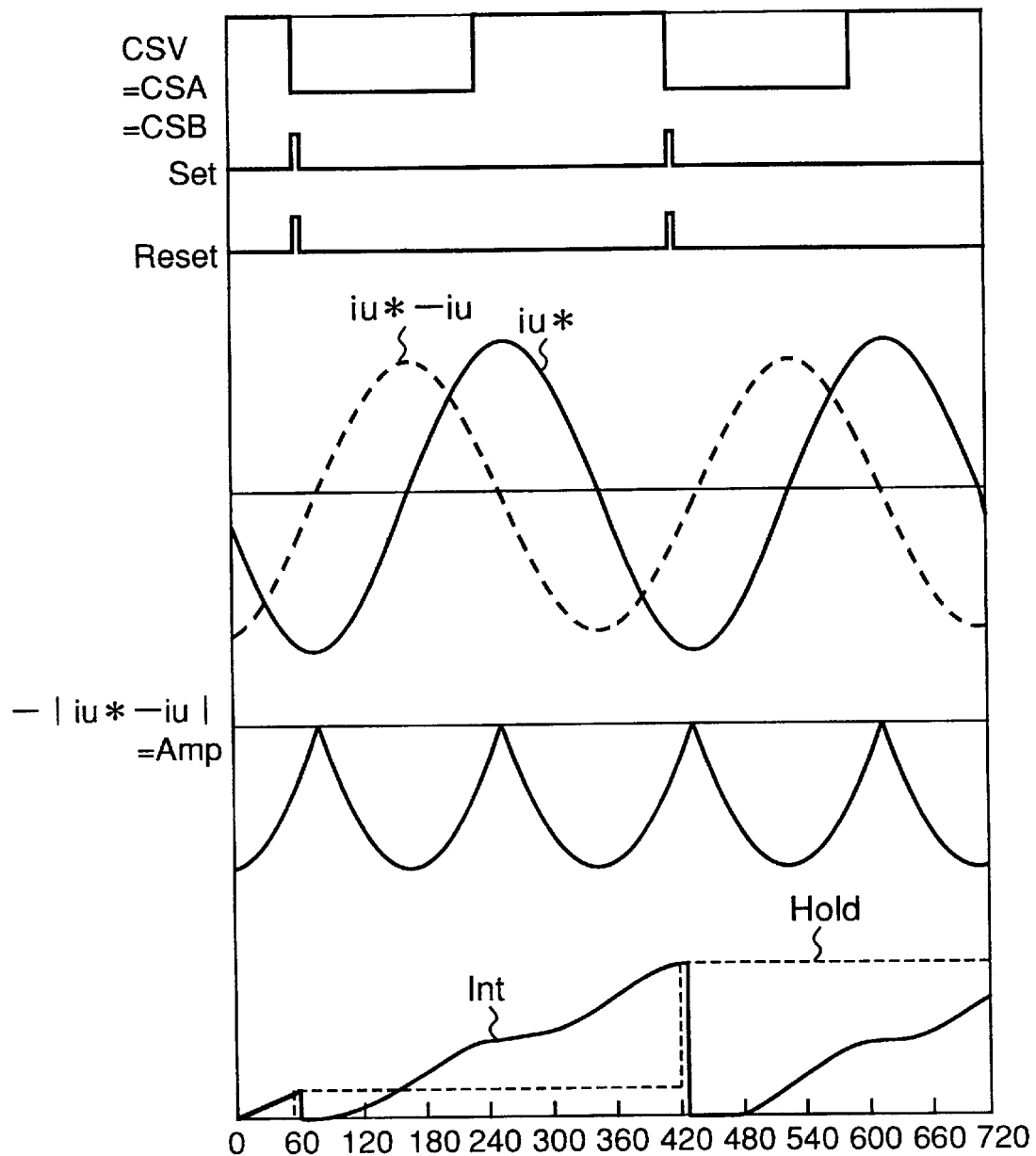
FIG. 8 is a waveform diagram for explaining the operation of the saturation degree production unit in the same.

The absolute value circuit 42, as diagrammed in FIG. 7, has the current error iu*−iu input to it, whereupon, as diagrammed in FIG. 8, it produces a value that is the absolute value of the current error iu*−iu with the sign changed, i.e. −|iu*−iu|, as the value of the current error amplitude value Amp with its sign changed, i.e. -Amp.

$$\frac{Vo}{Vi} = \frac{R41}{R40} \cdot \frac{1}{1 + s \cdot C41 \cdot R41} \tag{10}$$

The integration unit 50 are next described. The integration unit 50 comprise a switching divider controller 51, a pole-position signal switch 52, a divider 53, a set-pulse generator 54, a reset-pulse generator 55, an integrator 56, a set-hold device 57, and a multiplier 58.

The switching divider controller 51 produces a pole-position signal switching signal CSSW and a divisor Bun based on the rotational speed ω and current commands (Id* and Iq*), outputs the pole-position signal switching signal CSSW to the pole-position signal switch 52, and outputs the divisor Bun to the divider 53. As expressed in Eq 11, when the current phase command β* that is the current phase of the current commands (Id*,Iq*) is less than 30° (β*<30°), the pole-position signal switching signal CSSW is made 3 (CSSW=3), and when the current phase command β* is 30° or greater (β*≧30°), the pole-position signal switching signal CSSW is made 2 (CSSW=2). Meanwhile, as expressed in Eq 12, when the rotational speed ω is less than some set constant ω0 (ω<ω0), the divisor is made 1 (Bun=1), and when the rotational speed ω is equal to or greater than ω0 (ω≧ω0), the divisor is made 2 (Bun=2).ω

$$CSSW = \begin{cases} 3 & (\beta^* < 30°) \\ 2 & (\beta^* \geq 30°) \end{cases} \tag{11}$$

$$\text{Bun} = \begin{cases} 1 & (\omega < \omega 0) \\ 2 & (\omega \geq \omega 0) \end{cases} \tag{12}$$

The pole-position signal switch 52 selects one of the pole-position signals CSU, CSV, and CSW, based on the pole-position signal switching signal CSSW, and outputs this as the selected pole-position signal CSA to the divider 53. When the pole-position signal switching signal CSSW is 1, CSU is output as the CSA; when CSSW is 2, CSV is output as CSA; and when CSSW is 3, CSW is output as CSA. In this embodiment moreover, CSSW never becomes 1, so CSU will never be output.

The divider 53 divides the selected pole-position signal CSA by exactly the divisor Bun, and outputs a divided pole-position signal CSB to the set-pulse device 54.

The set-pulse device 54, as diagrammed in FIG. 7, is configured with an HC123, and, as diagrammed in FIG. 8, with the rise and fall of the divided pole-position signal CSB, produces a set pulse Set, that becomes a high level H, and outputs the set pulse Set to the reset-pulse device 55 and to the set-hold device 57. FIG. 8 represents the operation when β* is 40° and the rotational speed ω is less than ω0, with a pole-position signal switching signal CSSW of 2 and a divisor Bun of 1, so the selected pole-position signal CSA and the divided pole-position signal CSB will be the same as the pole-position signal CSV. The period for which the set pulse Set will stay H is determined by a resistor R54 and capacitor C54.

The reset-pulse device 55, as diagrammed in FIG. 7, is also configured with an HC123, and, as diagrammed in FIG. 8, with the rise and fall of the pulse-set Set, produces a reset pulse Reset, that becomes a high level H, and outputs Reset to the integrator 56. The period for which the reset pulse Reset will be H is determined by a resistor R55 and capacitor C55.

The integrator 56, as diagrammed in FIG. 7, comprises: an integration unit made up of an operational amplifier, a resistor R56, and a capacitor C56; a reset unit consisting of an analog switch; and a limiter unit made up of a transistor and a diode. As diagrammed in FIG. 8, the integration unit integrates the current error amplitude value Amp and produces an integration value Int. Here, the integration amplification factor is determined by a resistor R56 and capacitor C56. When the reset pulse Reset goes to H, the reset unit turns on the analog switch and sets the integration value Int to 0. Here, when a resistance is placed between the analog switch and the capacitor C56, noise generated when the switch is thrown is decrease In the limiter unit, when the integration value Int falls to 0 or below, current flows through the diode so that it will not fall below 0; when the integration value Int rises to or above the power supply voltage, current flows through a transistor connected in parallel with the analog switch so that it does not rise above the power supply voltage. The limiter unit is necessary to prevent the analog switch from being damaged or destroyed by a high voltage (higher than +5 V) being applied to the terminals of the analog switch, when the power supply voltage to the analog switch is +5 V, with a power supply voltage of ±15 V going to the operational amplifier, for example.

The set-hold unit 57, as diagrammed in FIG. 7, comprises an analog switch, capacitor, and operational amplifier. As diagrammed in FIG. 8, when the set pulse Set goes to H, the analog switch is on, at which time the integration value Int is set as a hold value Hold.

The multiplier 58 takes the quotient obtained by dividing the product of the rotational speed ω and the hold value Hold by the divisor Bun, and outputs it as the saturation degree Sat. The integration period is inversely proportional to the rotational speed ω, so, even if the current error is the same, when the rotational speed ω increases, the integration value Int decreases. The integration period is proportional to the divisor Bun, however, so, even if the current error is the same, when the divisor Bun increases, the integration value Int also increases. Accordingly, as described above, the integration value Int is corrected, and the saturation degree Sat is produced.

$$Sat = \frac{\omega \cdot \text{Hold}}{\text{Bun}} \qquad (13)$$

The effectiveness of dividing the pole-position signal is now discussed.

As diagrammed in FIG. 8, the integration unit 50 set the integration value Int to 0 during the period when the reset pulse Reset is H, and turn the analog switch on. At low rotational speeds, the period of the reset pulse Reset is sufficiently small compared to the integration period (the period of the pole-position signal in FIG. 8), so the integration value Int is precise enough. However, at high rotational speeds, the period of the reset pulse Reset is relatively long, and the period during which the integration value Int is made 0 becomes relatively long, so the integration value Int will become relatively small. That being so, in this embodiment, when the rotational speed ω exceeds a certain set constant ω0, the pole-position signal CSA is divided by 2 and the integration period is made relatively long.

Thus, when the rotational speed ω increases, the divisor Bun will be increased, resulting In a saturation degree Sat of good precision, and a motor controller is realized which performs high-efficiency weakening-field control.

Also, the motor controller of this embodiment functions such that, when the rotational speed ω increases, the voltage excess disappears due to the back voltage, the d axis current command Id* is increased, the current phase command β* is advanced and the voltage excess is increased. Therefore, the divisor Bun wherewith the current phase command β advances may also be increased, irrespective of the rotational speed ω.

Also, the divisor in this embodiment is 1 or 2, but a division by 3 or higher is also permissible. This divisor may also be made to change by more than one division, as, for example, divisions by 1 and by 3, respectively.

The effectiveness of selecting the pole-position signal is now discussed.

As described in the foregoing, the integration unit 50 set the integration value Int to 0 when the reset pulse Reset is H, so the saturation degree Sat will be diminished by the width of the reset pulse. Comparing the case where the reset pulse Reset goes to H when the current error iu*−iu is large with the case where the reset pulse Reset goes to H when the current error iu*−iu is small, it is found that the effect on the saturation degree Sat is smaller in the latter case.

Figure 9:
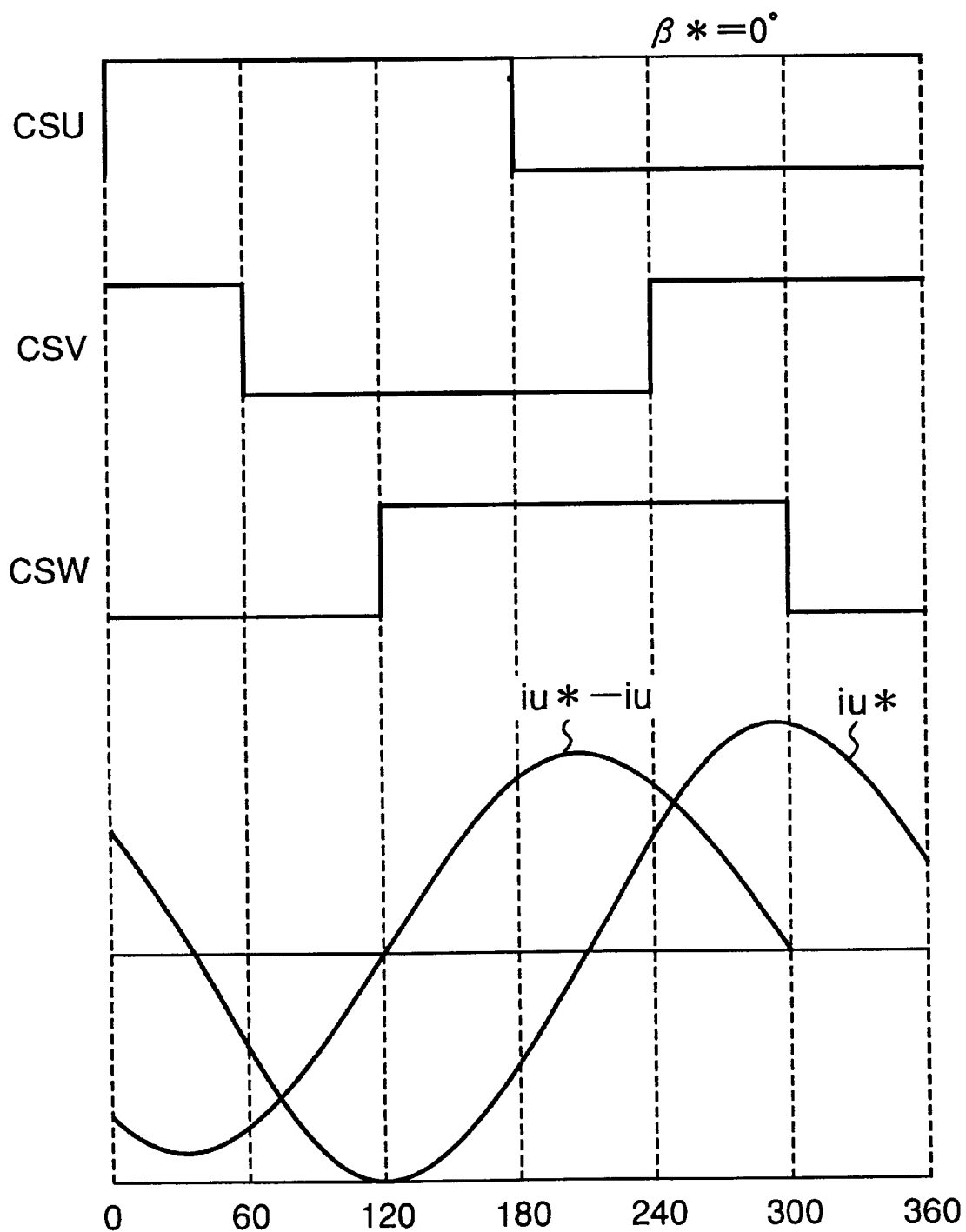
FIG. 9 is a waveform diagram representing the relationship between the pole-position signal, stator current command, and current error when the current phase command $\beta^*=0°$.

FIG. 9 is a waveform diagram representing the relationship between the pole-position signal, stator current command, and current error when the current phase command β*=0°. The pole-position signals CSU, CSV, and CSW are rectangular waves having a duty cycle of 50%, are at the same frequency as the stator current command iu*, and are mutually out of phase by 120° in the order CSU, CSW, CSV. When a sine wave is used as the stator current command, the stator current command iu* can be expressed as $\sin(\omega_e t)$, where $\omega_s$ is the electrical angular velocity. The stator current iu lags behind the stator current command iu*, so, if we represent this lag by α, then we have the term $\sin(\omega_s t + \alpha)$. Thereupon, the current error iu*−iu will be given as expressed in Eq 14, lagging 90° behind the stator current command iu*. Here α is so small that the second formula can be approximated by the third formula.

$$iu^* - iu \begin{cases} = \sin(\omega e \cdot t) - \sin(\omega e \cdot t + \alpha) \\ = 2\sin(\alpha/2)\sin(\omega e \cdot t + 90° + \alpha/2) \\ \cong 2\sin(\alpha/2)\sin(\omega \cdot t + 90°) \end{cases} \quad (14)$$

The current error iu*–iu will become 0 at 120° and 300°, with the rise and fall in CSU shifted by 60°, the rise and fall of CSV shifted by 60°, and the rise and fall of CSW shifted by 0°, so that the shift between rise and fall is smallest in CSW. That being so, when the current phase command β*=0°, by producing a set pulse Set with either the rise or fall of CSW, the reset pulse Reset is produced where the current error iu*–iu is small, thereby reducing the effect on the saturation degree Sat.

Figure 10:
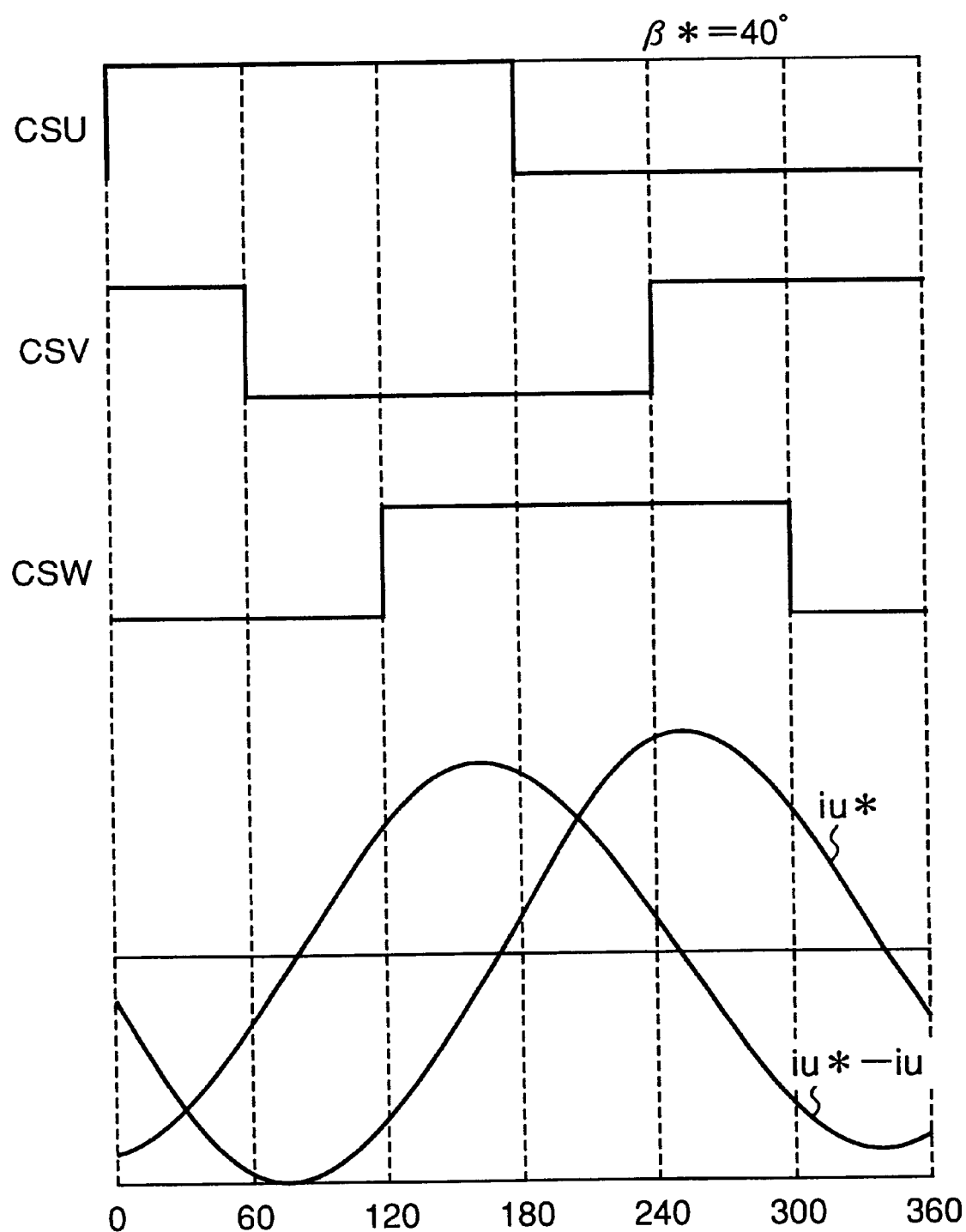
FIG. 10 is a waveform diagram representing the relationship between the pole-position signal, stator current command, and current error when the current phase command $\beta^*=40°$.

FIG. 10 is a waveform diagram representing the relationship between the pole-position signal, stator current command, and current error when the current phase command β*=40°. Comparing the stator current command iu* when β=40° and the stator current command iu* when β=0°, since the phase has advanced 40°, the phase of the current error iu*–iu is also advanced 40°. The current error iu*–iu will become 0 at 80° and 260°, with the rise and fall in CSU shifted 80°, the rise and fall in CSV shifted 20°, and the rise and fall in CSW shifted 40°, so that the shift between rise and fall is smallest in CSV. That being so, when the current phase command β* =40°, by producing a set pulse Set with either the rise or fall of CSV, the reset pulse Reset is produced where the current error iu*–iu is small, thereby reducing the effect on the saturation degree Sat.

Now, when β=30°, the current error iu*–iu will become 0 at 90° and 270°, with the rise and fall in CSV shifted 30°, and the rise and fall in CSW shifted 30°. Therefore, by making the boundary at a current phase command β*=30°, producing a set pulse Set by either the rise or fall in CSW when the current phase command β* is smaller than 30° (β*<30°), and producing a set pulse Set by either the rise or fall in CSV when the current phase command β* is equal to or greater than 30° (β*≧30°), the Reset pulse is produced where the current error iu*–iu is small.

In this manner, when the current phase command β* advances, a saturation degree Sat of good precision is realized by switching the selected pole-position signal, thereby realizing a motor controller that effects high-efficiency weakening-field control.

Also, the motor controller of this embodiment functions such that, when the rotational speed ω increases, the voltage excess disappears due to the back voltage, the d axis current command Id* is increased, the current phase command β* is advanced and the voltage excess is increased. Therefore, the pole-position signal selected when the rotational speed ω increases may be switched, irrespective of the current phase command β*.

The benefits of using only the pole-position signal CSV as the selected pole-position signal will now be discussed.

In this embodiment, the pole-position signal is selected from among CSU, CSV, and CSW with the pole-position signal switch 52. It may be desirable to omit the pole-position signal switch to save costs, however, in which case only the CSV would be used.

As described earlier, if with a current phase command of from β*=0° to β*=30° the set pulse Set is produced by either the rise or fall of CSW, and at current phase commands above β=30° the set pulse Set is produced by either the rise or fall of CSV, a saturation degree Sat of good precision is realized. Here, when performing weakening-field control, the phase is often advanced beyond β*=30°. Moreover, with brushless motors having reverse saliency, maximum output torque is achieved by slightly advancing the current phase command β*, so that, when performing weakening-field control, advances beyond β*=30° occur even more frequently.

Thus, when producing the saturation degree Sat from the current error iu*–iu, by producing the set pulse Set, and producing the reset pulse Reset, with either the rise or fall of the pole-position signal CSV, a saturation degree Sat of good precision is realized, and a motor controller that performs high-efficiency weakening-field control is realized.

Similarly, moreover, when producing the saturation degree Sat from the current error iv*–iv, by producing the set pulse Set, and producing the reset pulse Reset, with either the rise or fall of the pole-position signal CSW, a saturation degree Sat of good precision is realized, and a motor controller that performs high-efficiency weakening-field control is realized.

And similarly, moreover, when producing the saturation degree Sat from the current error iw*–iw, by producing the set pulse Set, and producing the reset pulse Reset, with either the rise or fall of the pole-position signal CSV, a saturation degree Sat of good precision is realized, and a motor controller that performs high-efficiency weakening-field control is realized.

A second embodiment of the present invention is now described, considering first the overall configuration.

Figure 11:
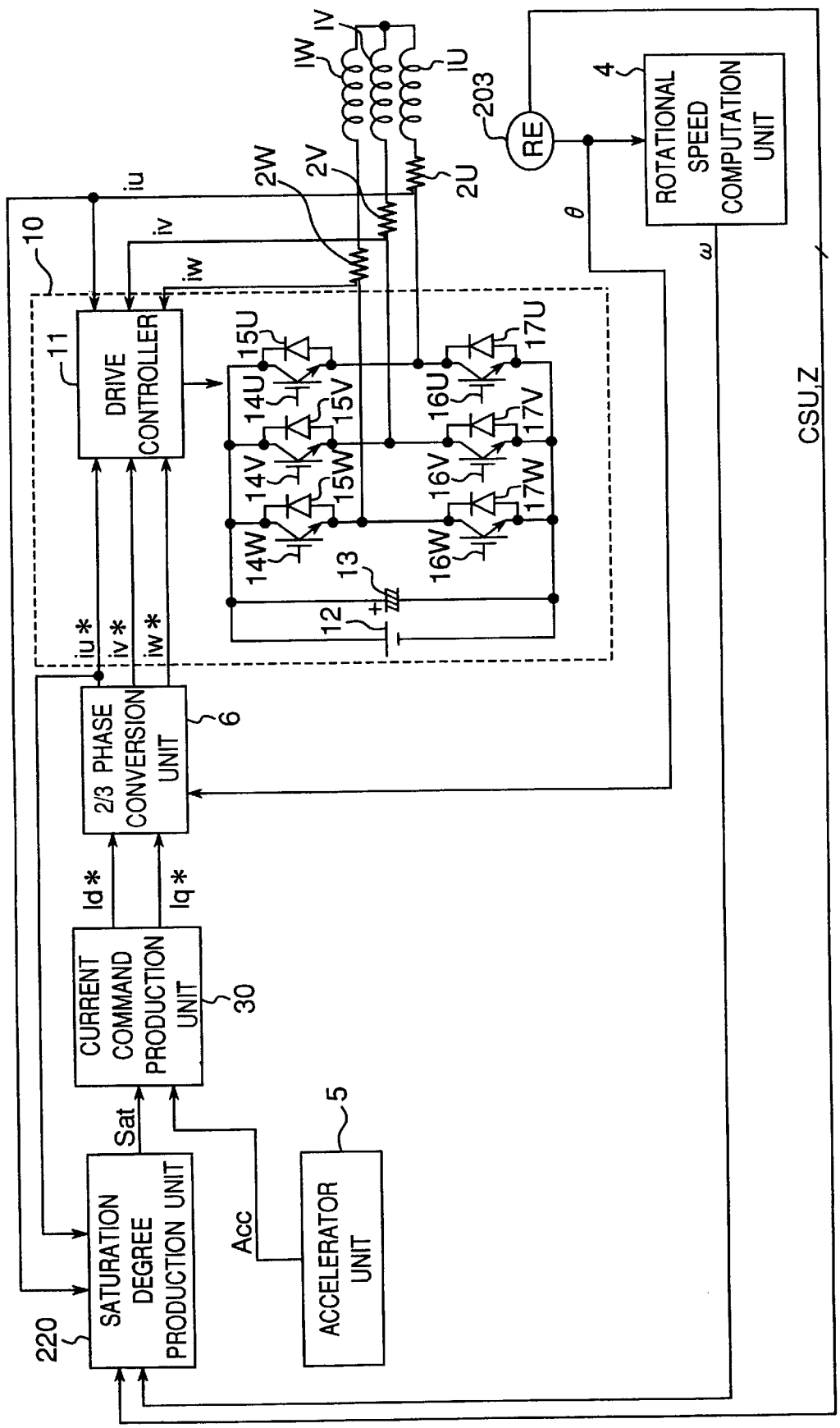
FIG. 11 is a block diagram representing the operation of a motor controller in a second embodiment.

FIG. 11 is a block diagram representing the operation of a motor controller in the second embodiment. Elements coinciding with the first embodiment are indicated by the same reference characters. A rotary encoder 203 detects the pole positions, reference position, and rotated position θ of the rotor of a brushless motor, outputting a pole-position signal CSV that indicates the pole positions and a reference position signal z that indicates a reference position which generates one pulse per revolution to the saturation degree production unit 20, and outputting the rotated position θ both to the rotational speed computation unit 4 and ⅔ phase conversion unit 6. The saturation degree production unit 220 produces a saturation degree Sat, by a method discussed below, based on the pole-position signal CSV, reference position signal z, rotational speed ω, stator current command iu*, and stator current iu, and outputs Sat to the current command production unit 30.

The current command production unit 30, furthermore, does not output the d axis current command Id* and q axis current command Iq* to the saturation degree production unit 220. The configuration is otherwise the same as that of the first embodiment, and no further description thereof is given here.

The configuration and operation of the saturation degree production unit 220 are now described.

Figure 12:
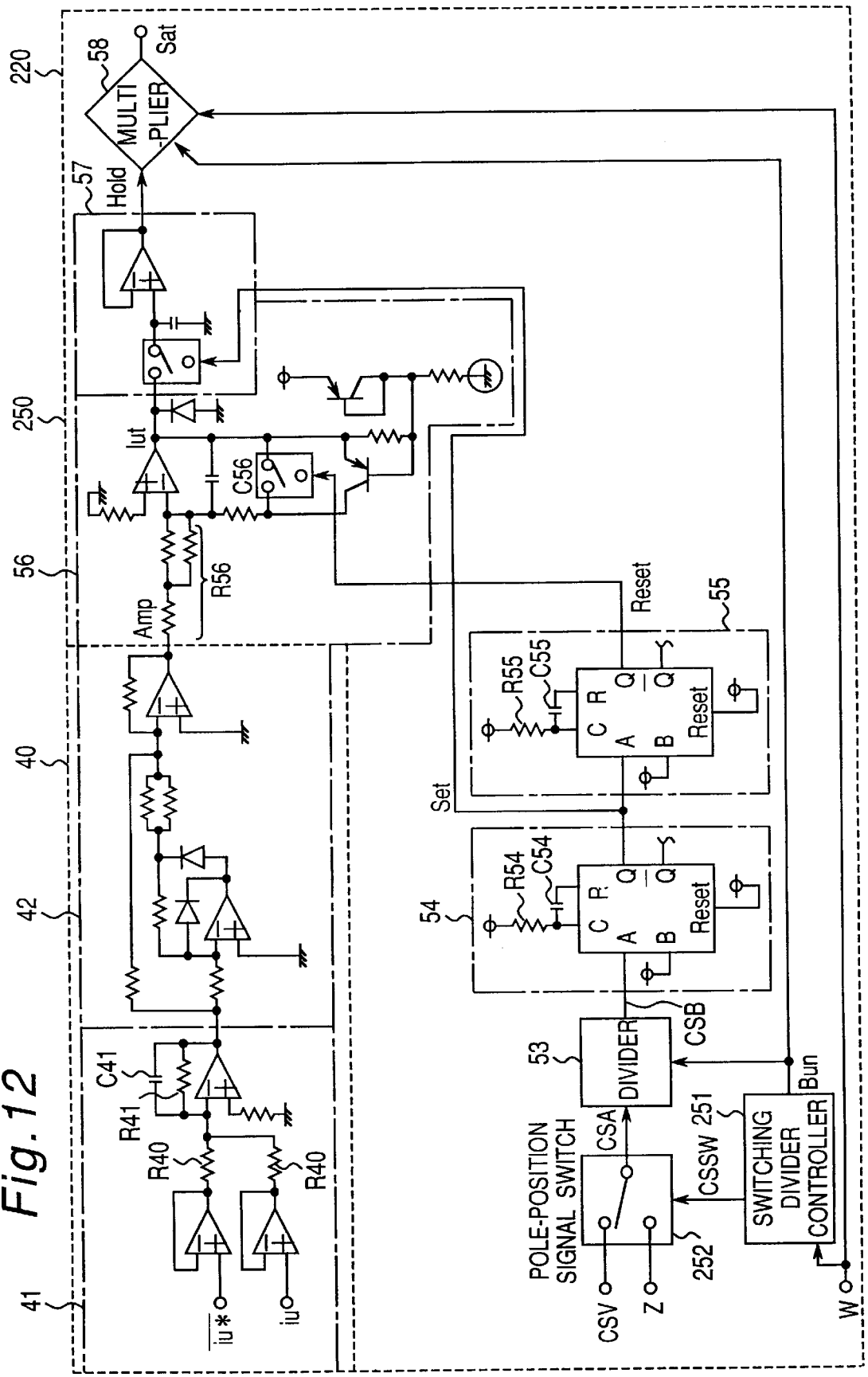
FIG. 12 is a schematic diagram of the saturation degree production unit in the same.

FIG. 12 is a schematic diagram of the saturation degree production unit in the second embodiment. Except for a switching divider controller 251 and pole-position signal switch 252 in integration unit 250, the configuration is the same as in the first embodiment, and the same reference characters are employed, so no further description thereof is given here.

The switching divider controller 251 produces a pole-position signal switching signal CSSW and a divisor Bun, based on the rotational speed a, outputting the pole-position signal switching signal CSSW to the pole-position signal switch 52 and outputting the divisor Bun to the divider 53 and multiplier 58. As expressed below in Eq 15, when the rotational speed ω is smaller than some set constant ω20 (ω<ω20), the pole-position signal switching signal CSSW is set at 2 (CSSW=2). and when the rotational speed ω is equal to or greater than ω20 (ω≧ω20), the pole-position signal switching signal CSSW is set to 0 (CSSW=0). Meanwhile, the divisor Bun is determined in the same way as in the first embodiment.

$$CSSW = \begin{cases} 2 & (\omega < \omega 20) \\ 0 & (\omega \geq \omega 20) \end{cases} \quad (15)$$

The pole-position signal switch 252 selects one signal from among the pole-position signal CSV and the reference position signal z, based on the pole-position signal switching signal CSSW, and outputs this as the selected pole-position signal CSA to the divider 53. When the pole-position signal switching signal CSSW is 2, CSV is output as CSA, and when the pole-position signal switching signal CSSW is 0, z is output as CSA. Here, then, the reference position signal z is also selected, but is called the selected pole-position signal CSA for convenience.

The benefits of selecting the pole-position signal CSV and the reference position signal z are now discussed.

The integration unit 250, as diagrammed in FIG. 8, during the period when the reset pulse Reset is H, turn the analog switch on to set 0 as the integration value. At low rotational speeds, the period of the reset pulse Reset is sufficiently small compared to the integration period (i.e. the period of the pole-position signal in FIG. 8), so the integration value Int is precise. At high rotational speeds, however, the period of the reset pulse Reset becomes relatively long, the period wherein the integration value Int is 0 becomes relatively long, and the integration value Int becomes relatively small.

Also, the pole-position signal CSV is a signal that corresponds to the pole positions of the rotor, whereupon the electrical angle becomes 1 period per revolution, so this corresponds to P/2 periods (where P is the number of poles) per rotor revolution. Meanwhile, the reference position signal z corresponds to 1 period per rotor revolution, so the period thereof is longer than that of the pole-position signal by a factor of P/2.

Thereupon, with this embodiment, when the rotational speed ω exceeds a certain set constant ω20, the selected pole-position signal CSA is changed from the pole-position signal CSV to the reference position signal z and the integration period is made relatively long.

Thus, when the rotational speed ω increases, by switching from a procedure wherein the integration period is determined on the basis of the pole-position signal CS to a procedure wherein it is determined on the basis of the reference position signal z, a saturation degree Sat of good precision is realized, and a motor controller that performs high-efficiency weakening-field control is realized.

Also, the motor controller of this embodiment functions such that, when the rotational speed ω increases, the voltage excess disappears due to the back voltage, the d axis current command Id* is increased, the current phase command β* is advanced and the voltage excess is increased. Therefore, the pole-position signal CSV and reference position signal z may be switched between with the current phase command β*, irrespective of the rotational speed ω.

A third embodiment of the present invention is now described, considering first the overall configuration.

Figure 13:
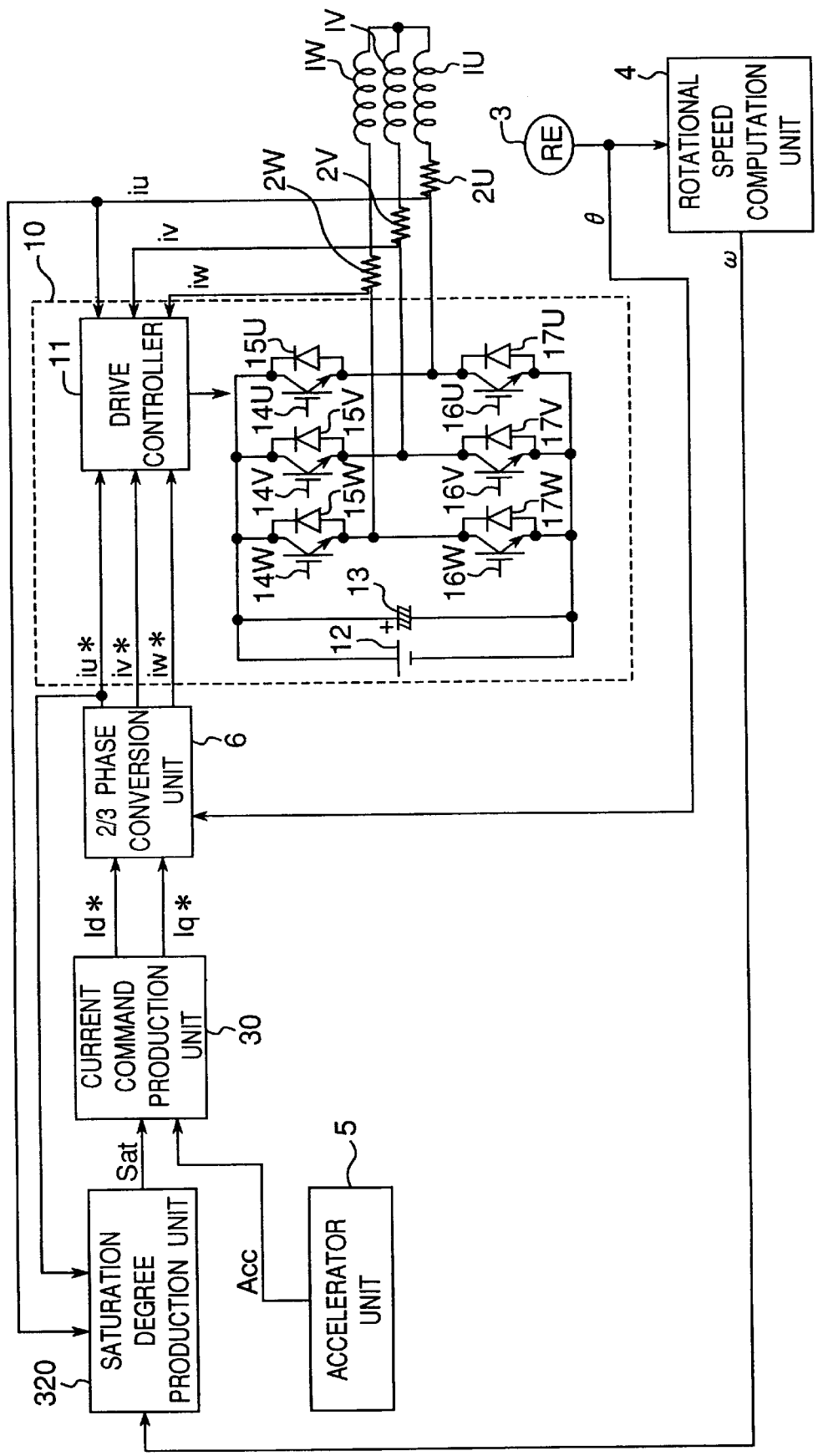
FIG. 13 is a block diagram representing the operation of a motor controller in a third embodiment.

FIG. 13 is a block diagram representing the operation of a motor controller in the third embodiment Elements coinciding with the first embodiment are indicated by the same reference characters. A saturation degree production unit 320 produces a saturation degree Sat, by a method described below, based on the rotational speed ω, stator current command iu*, and stator current iu, and outputs Sat to the current command production unit 30.

The rotary encoder 3 does not output pole-position signals CSU, CSV, and CSW. The current command production unit 30 does not output d axis or q axis current commands Id* or Iq* to the saturation degree production unit 320.

Otherwise, the configuration is the same as that in the first embodiment, so no further description is given here.

The configuration and operation of the saturation degree production unit 320 are now described.

Figure 14:
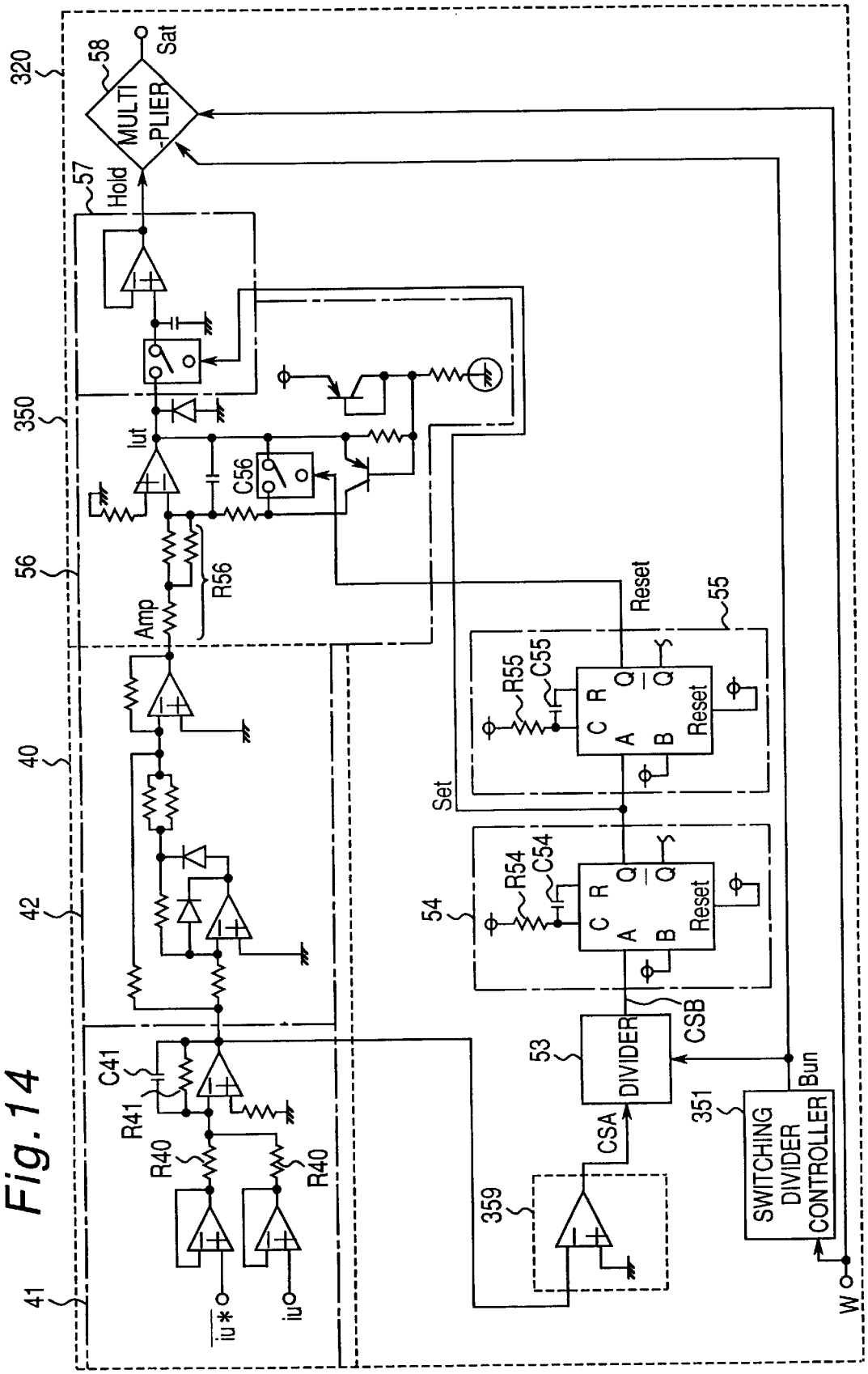
FIG. 14 is a schematic diagram of the saturation degree production unit in the same.

FIG. 14 is a schematic diagram of the saturation degree production unit in the third embodiment. Except for a switching divider controller 351 and selected pole-position signal producer 359 in integration unit 350, the configuration is the same as that in the first embodiment, and the same reference characters are employed, so no further description is given here.

The switching divider controller 351 produces a divisor Bun by the same method as the first embodiment and outputs it to the divider 53 and multiplier 58.

The selected pole-position signal producer 359 comprises a comparator, inputs the current error iu* - iu output by the adder circuit 41 in the amplitude value production unit 40, compares the current error iu* - iu against 0, and forms a rectangular wave which it outputs as the selected pole-position signal to the divider 53.

The effectiveness of producing the selected pole-position signal from the current error is now discussed.

The integration unit 350 set the integration value Int to 0 when the reset pulse Reset is H, so the saturation degree Sat is diminished by the amount of the reset pulse width. Comparing the case where the reset pulse Reset goes to H when the current error iu* - iu is large and the case where the reset pulse Reset goes to H when the current error iu* - iu is small, the effect produced on the saturation degree Sat is less in the latter case.

When the current error iu* - iu is formed as a rectangular wave, and the set pulse Set and reset pulse Reset are produced by either the rise or fall thereof, during the period wherein the reset pulse is generated, the current error iu* - iu is almost 0, so there is little effect on the saturation degree Sat.

Thus, when the integration period is set by the timing of the current error becoming 0, a saturation degree Sat of good precision is produced, and a motor controller is realized which performs high-efficiency weakening-field control.

The current error iu* - iu is used here, but it is also permissible to use either the current error iv* - iv or the current error iw - iw.

A fourth embodiment of the present invention is now described, considering first the overall configuration.

Figure 15:
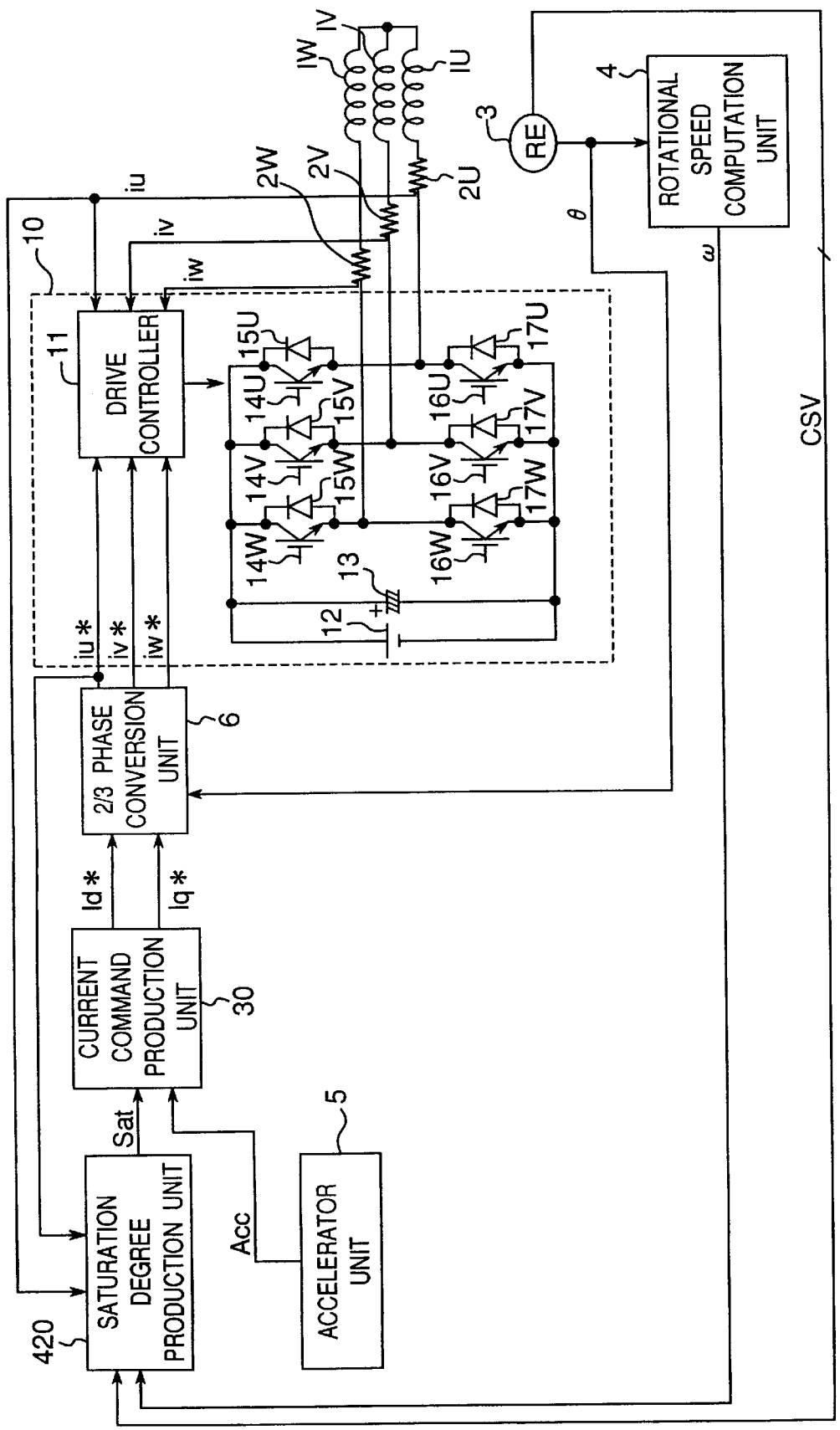
FIG. 15 is a block diagram representing the operation of a motor controller in a fourth embodiment.

FIG. 15 is a block diagram representing the operation of a motor controller in the fourth embodiment. Elements coinciding with those in the first embodiment are indicated by the same reference characters. A saturation degree production unit 420 produce a saturation degree Sat, by a method described below, based on the rotational speed ω, pole-position signal CSV, stator current command iu*, and stator current iu, and output Sat to the current command production unit 30.

The rotary encoder 3 outputs the pole-position signal CSV to the saturation degree production unit 420. The current command production unit 30 do not output the d axis current command Id* and q axis current command Iq* to the saturation degree production unit 420.

The configuration and operation of the saturation degree production unit 420 are now described.

Figure 16:
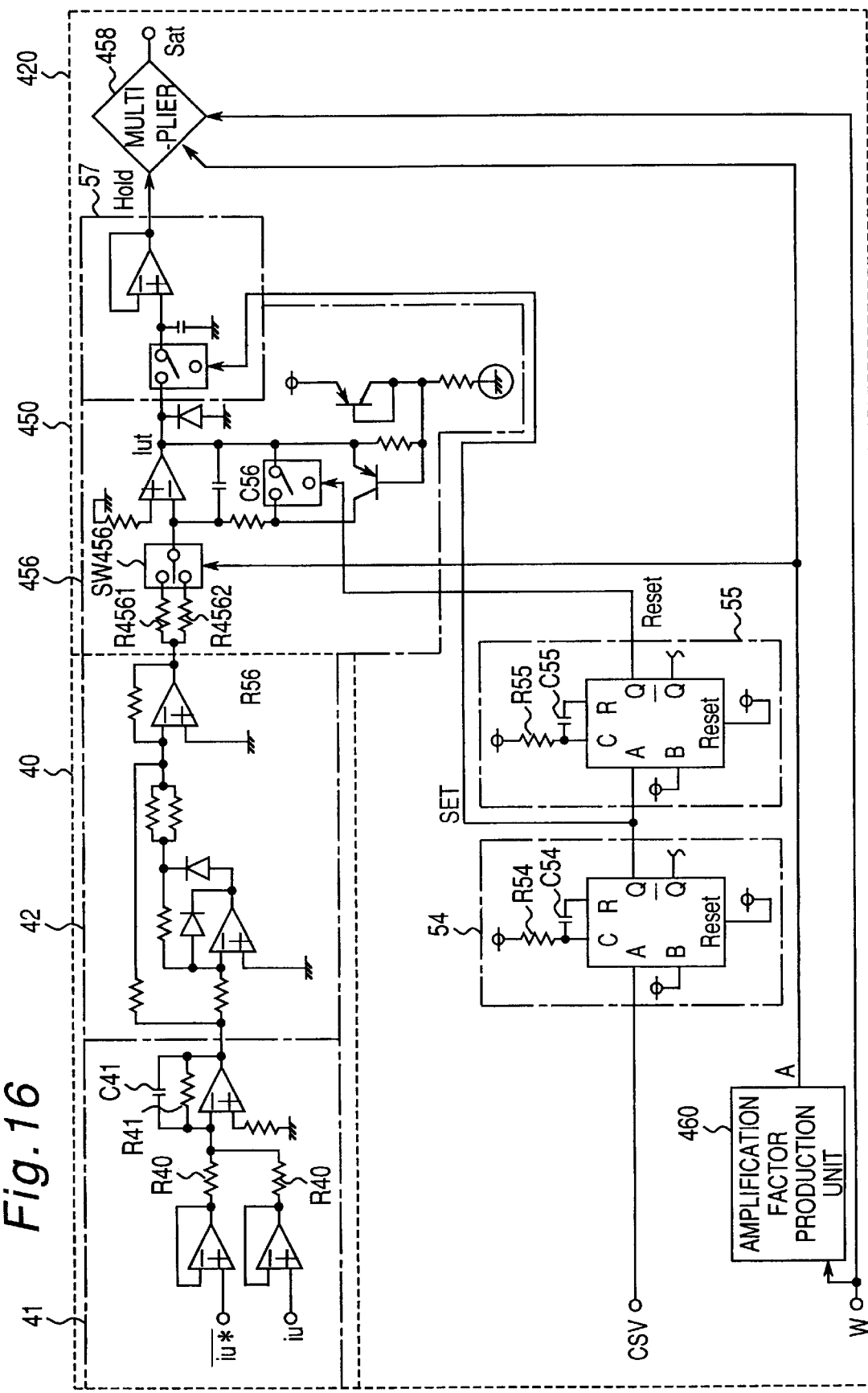
FIG. 16 is a schematic diagram of the saturation degree production unit in the same.
Figure 17:
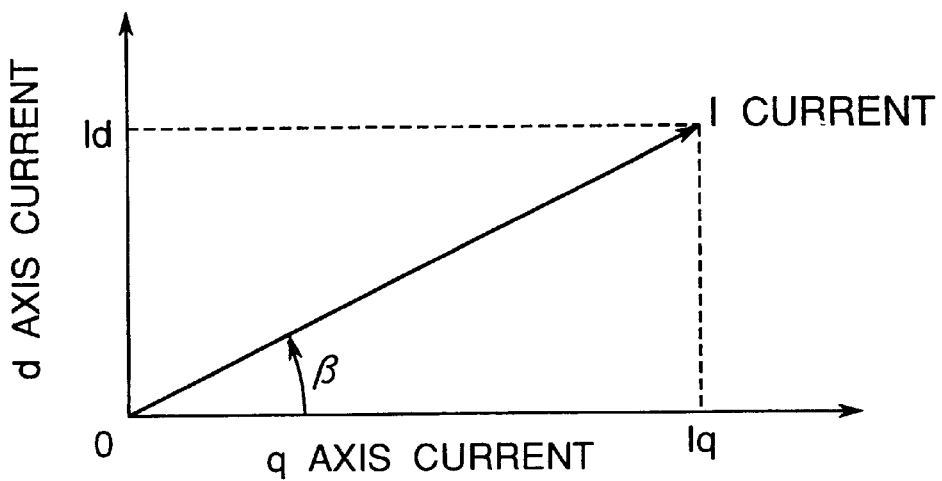
FIG. 17 is a relational diagram for the d axis current, q axis current, and current phase.

FIG. 16 is a schematic diagram of the saturation degree production unit in the fourth embodiment. Except for an amplification factor production unit 460, integrator 456, and multiplier 458, the configuration is the same as in the first embodiment, the same reference characters are employed as in the first embodiment, and no further description is given here.

The pole-position signal CSV is input to the set-pulse device 54. The remainder of the operation is the same as in the first embodiment, so no further description is given here.

The amplification factor production unit 460 input the rotational speed ω, and output an amplification factor a to a switch SW456 in the integrator 4561 and to the multiplier 458. When ω is smaller than some set constant ω40 (ω<ω40), the amplication factor a is set to 1 (a=1), and when ω is equal to or greater ω40 (ω≧ω40), the amplification factor a is set to 2 (a=2).

$$a = \begin{cases} 1 & (\omega < \omega 40) \\ 2 & (\omega \geq \omega 40) \end{cases} \quad (16)$$

The integrator 456 comprises: an integration unit made up of an operational amplifier, resistors R4561 and R4562, switch SW456, and capacitor C56; a reset unit consisting of an analog switch; and a limiter unit made up of a transistor and a diode. In the integration unit, the analog switch SW456 connects the resistor R4561 to the operational amplifier when the amplitude factor a is 1 (a=1), and connects the resistor R4562 to the operational amplifier when the amplitude factor a is 2 (a=2). The ratio between the resistance values of the resistors R4561 and R4562 is set at 2 (R4561/R4562=2). The integration gain of the integration circuit is inversely proportional to the resistance value. Therefore, as compared to when a=1, when a=2, and the resistance is cut in half, the integration gain is doubled The operation of the reset unit and limiter unit are the same as in the first embodiment, and so is not further described here.

The multiplier 458 outputs a saturation degree Sat that is the quotient obtained by dividing the product of the rotational speed ω and hold value Hold by the amplification factor a. The integration period varies inversely with the rotational speed ω, so, when the rotational speed ω increases, even if the current error is the same, the integration value Int decreases. The integration gain is directly proportional to the amplification factor a, however, so, when the amplification factor a increases, the integration value Int also increases even if the current error is the same. Hence, as described earlier, the integration value Int is corrected, and the saturation degree Sat is produced.

$$Sat = \frac{\omega \cdot Hold}{a} \quad (17)$$

The effectiveness of setting the amplification factor a is now described.

There are cases where the integrator 456 and set-old device 57 are implemented in analog circuitry, while the multiplier 458 is configured as a digital circuit (such as a CPU). In such cases, the old value Hold is A/D converted and input by the multiplier 458, but, when this is done, a quantization error occurs. Let us here consider what effects this quantization error has when the rotational speed a changes. If the A/D converter unit of the multiplier 458 has a range of 0 to 5 V and a resolution capability of 8 bits, the quantization error is 0.02 V (=5 V/$2^8$). If it is assumed here that, at some rotational speed, the Hold value is 4 V, then the quantization error will be 0.5% of the Hold value, (0.02 V/4 V). Now, when the rotational speed a is doubled, and the current error is the same, the integration period will be halved, resulting in a Hold value of 2 V, whereupon the quantization error will be 1% of the Hold value, (0.02 V/2 V), and so will be doubled. Thus the quantization error increases when the rotational speed ω increases. This being so, when the rotational speed increases, the amplification factor of the integrator 456 is increased to suppress any increase in the quantization error.

By increasing the amplification factor of the integrator 456 when the rotational speed ω increases, in this way, a saturation degree Sat of good precision is produced, and a motor controller is realized that performs weakening-field control with high efficiency. In this embodiment, furthermore, the resistance value in the integrator 456 is varied, but the capacitor of the capacitor may be varied as well. In this embodiment, moreover, the amplification factor of the integrator 456 is varied, but it is also permissible to vary the amplification factor of either the adder circuit 41 or absolute value circuit 42 in the amplitude value production unit 40. And in this embodiment, the amplification factor a may have one of two values, but this amplification factor may, alternatively, have three or more values, or be varied continuously. Furthermore, in the first through fourth embodiments described in the foregoing, the current command production unit 30 increase or decrease the d axis current command Id* by the saturation degree Sat, as expressed in Eq 7. Increasing the d axis current command Id* is equivalent to advancing the current phase command β*. Accordingly, the current command production unit may be suitably designed so that they increase and decrease the current phase command β*, as expressed below in Eq 18, where β*old is the previous value of the current phase command β*.

$$\beta^* = \beta^* old + Gai \cdot (Sat - Ref) \quad (18)$$

In the embodiments described in the foregoing, in producing the d axis current command Id* (Eq 7), only an integration operation is performed. Within the scope of the present invention, however, this need not be only an integration operation, so long as one or more operations are performed from among comparison, integration, and differentiation operations. Eq 19, for example, expresses the production of the d axis current command Id* when a comparison, integration, and differentiation operation are incorporated, where Id*(i) is the i'the d axis current command Id*, e(i) is the i'the difference between the saturation degree sat and the reference value Ref (Sat–Ref), KI is to integration gain, KP is the proportional gain, KD is the differential gain, and (i-1) and (i-2), are the operations that are 1 and 2 operations before the i'the operation, respectively. In the embodiment described above, the configuration is such that not only KI is 0, but KP and KD are 0 also.

$$Id^*(i) - Id^*(i-1) = KI \cdot e(i) + KP \cdot \{e(i) - e(i-1)\} + KD \cdot \{e(i) - 2e(i-1) + e(i-2)\} \quad (19)$$

In the embodiments described in the foregoing, a lowpass filter is used in finding the current error Iu*–iu, but a bandpass filter may be used instead. The saturation degree Sat is used when performing weakening-field control at high rotational speeds, so no low-speed component is necessary. Accordingly, by going from a lowpass filter to a bandpass filter, the saturation degree Sat can be obtained with good precision even when there is a DC component error. The filter need not act only on the current error iu*–iu, moreover, but may act on at least one of the stator current iu, current error iu*–iu, or current error amplitude value Amp.

In the embodiments described in the foregoing, an integer multiple of the period of the pole-position signal is made the integration period for producing the saturation degree Sat. However, since the period of the current error amplitude value Amp is half the period of the pole-position signal, the integration period may be made an integer multiple of the pole-position signals half period. Here, when there is an offset in the current error, the precision of the saturation degree Sat will deteriorate, but because the integration period is short, the response of the weakening-field control speeds up. In the embodiments described in the foregoing, the absolute value of the current error is used as the current error amplitude value Amp, but it is also permissible to use the square of the current error. And the set pulse Set is produced by the fall of the pole-position signal, but it may instead be produced by the rise of the pole-position signal.

In the drawings employed in describing the foregoing embodiments, the brushless motor is made an embedded-magnet type, wherefore the current phase β0 effecting maximum torque is not 0. The present invention is not limited to the embedded-magnet type of brushless motor, however, but also extends to applications in surface-magnet type brushless motors and in brushless motors exhibiting saliency.

The motor controller described in the foregoing does not only control brushless motors, but the present invention extends also to control applications for other motors such as synchronous reluctance motors.

Three phases were used for the stator current commands iu*, iv*, and iw*, and for the stator currents iu, iv, and iw, but it is also permissible to use only two phases, and to use the sum of those two phases, with its sign changed, as the other phase.

IGBTs were used in the drive unit 10, but other drive devices may be used instead, such as bipolar transistors or MOS-FETS. A DC power supply is also indicated, but this may be an AC power supply rectified to provide DC power.

When motors used in electric automobiles, etc., are weakening-field controlled by means of the present invention, as described in the foregoing, the current phase is varied based on saturation degrees of good precision, so that high-efficiency weakening-field control can be realized. This is a significant benefit.

What is claimed is:

1. A motor controller comprising:
   a rotor having P poles (where P is 2 or a greater even number);
   K-phase stator windings (where K is 2 or a greater integer) for generating magnetic flux that interlinks with said rotor;
   current command production unit for producing current commands that are current values for stator currents flowing through said stator windings;
   drive unit for supplying electric power to said stator windings based on said current commands;
   stator current detection unit for detecting stator currents flowing through said stator windings and producing stator current signals;
   saturation degree production unit for producing a saturation degree indicating by what amount said stator current is not following said current command; and
   pole-position signal production unit for producing pole-position signals based on pole positions of said rotor;
   said current command production unit producing said current commands based on said saturation dye; and
   said saturation degree production unit producing said saturation degree based on said current commands, said stator current signals, and said pole-position signals.

2. The motor controller according to claim 1, wherein said saturation degree production unit comprise: amplitude value production unit for producing a current error amplitude value indicating size of difference between said current command and said stator current; and integration unit for taking result of integrating said current error amplitude value for a period that is exactly n multiples of the half period of said pole-position signal (where n is an integer) and making that said saturation degree.

3. The motor controller according to claim 2, wherein said stator windings comprise 3 phases; and said integration unit take result of integrating U phase current error amplitude value from rise or fall of V phase pole-position signal and make that said saturation degree.

4. The motor controller according to claim 2, wherein said stator windings comprise 3 phases; and said integration unit take result of integrating V phase current error amplitude value from rise or fall of W phase polo-position signal and make that said saturation degree.

5. The motor controller according to claim 2, wherein said stator windings comprise 3 phases; and said integration unit take result of integrating W phase current error amplitude value from rise or fall of U phase pole-position signal and make that said saturation degree.

6. The motor controller according to claim 2, wherein said integration unit change value of n based on at least one or other of motor rotational speed and current command.

7. The motor controller according to claim 6, wherein said integration unit increase value of n when motor rotational speed increases.

8. The motor controller according to claim 6, wherein said integration unit increase value of n when current phase of current command advances.

9. The motor controller according to claim 2, wherein said integration unit make either rise or fall of K-phase pole-position signal an integration-start time indicating timing whereby integration is started, and vary said integration-start time based on at least one or other of said rotational speed and stator current command.

10. The motor controller according to claim 2, wherein amplification factor production unit are added for producing an amplitude factor based on at least one or other of said motor rotational speed and current command; and said amplitude value production unit produce a current error amplitude value based on said amplification factor.

11. The motor controller according to claim 2, wherein amplification factor production unit are added for producing an amplitude factor based on at least one or other of said motor rotational speed and current command; and said integration unit perform integration based on said amplification factor.

12. The motor controller according to claim 10, wherein said amplification factor production unit increase said amplification factor when motor rotational speed increases.

13. The motor controller according to claim 11, wherein said amplification factor production unit increase said amplification factor when motor rotational speed increases.

14. The motor controller according to claim 10, wherein said amplification factor production unit increase said amplification factor when current phase of current command advances.

15. The motor controller according to claim 11, wherein said amplification factor production unit increase said amplification factor when current phase of current command advances.

16. The motor controller according to claim 1, wherein reference position signal production unit are added for producing a reference position signal indicating a reference position for rotor rotated position; and said saturation degree production unit produce a selection signal from result of selecting either said pole-position signal or said reference position signal, based on at least one or other of motor rotational speed and stator current command, and produce said saturation degree based on said selection signal.

17. The motor controller according to claim 16, wherein said saturation degree production unit comprise: amplitude value production unit for producing a current error amplitude value indicating size of difference between said current command and stator current; and integration unit that, at low speeds, integrate said current error amplitude value only during a period that is the n multiple of said pole-position signal (where n is an integer), and make that result said saturation degree, and, at high speeds, integrate said current error amplitude value only during a period that is the m multiple of said reference position signal (where m is an integer), and make that result said saturation degree.

18. A motor controller comprising:

a rotor having P poles (where P is 2 or a greater even number);

K-phase stator windings (where K 2 or a greater integer) for generating magnetic flux that interlinks with said rotor;

current command production unit for producing current commands that are current values for stator currents flowing through said stator windings;

drive unit for supplying electric power to said stator windings based on said current commands;

stator current detection unit for detecting stator currents flowing through said stator windings and producing stator current signals;

saturation degree production unit for producing a saturation degree indicating by what amount said stator current is not following said current command; and pole-position signal production unit for producing pole-position signals based on pole positions of said rotor;

coordinate conversion unit for producing stator current commands based on said current commands by coordinate conversion;

said current command production unit producing said current commands based on said saturation degree;

said saturation degree production unit comprising:

amplitude value production unit for producing a current error amplitude value indicating size of difference between said current command and stator current; and integration unit for integrating said current error amplitude value for a period that is n multiples (n is an integer) of the half period of said pole-position signal, an integration-start time being at a zero crossing point of a signal indicative of a difference between K-phase stator current command and said stator current, and an integrated value being used as said saturation degree.

19. The motor controller according to claim 18, wherein said current error amplitude value corresponds to an absolute value of a difference between said stator current command and said stator current.

20. The motor controller according to claim 2, wherein said current error amplitude value corresponds to an absolute value of a difference between said stator current command and said stator current.

* * * * *

UNITED STATES PATENT AND TRADEMARK OFFICE
CERTIFICATE OF CORRECTION

PATENT NO. : 5,923,728
DATED : July 13, 1999
INVENTOR(S) : Y. IKKAI et al.

It is certified that error appears in the above-identified patent and that said Letters Patent is hereby corrected as shown below:

At column 22, line 18 (claim 4, line 4) of the printed patent, "polo-position" should be —pole-position—.

Signed and Sealed this

Seventeenth Day of October, 2000

Attest:

Q. TODD DICKINSON

*Attesting Officer*  *Director of Patents and Trademarks*